US012759517B2

(12) United States Patent
Seo

(10) Patent No.: US 12,759,517 B2
(45) Date of Patent: Oct. 13, 2026

(54) ELECTRIC BRAKE SYSTEM

(71) Applicant: HL MANDO CORPORATION, Gyeonggi-do (KR)

(72) Inventor: Dongil Seo, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 64 days.

(21) Appl. No.: 18/889,366

(22) Filed: Sep. 18, 2024

(65) Prior Publication Data

US 2025/0319850 A1 Oct. 16, 2025

(30) Foreign Application Priority Data

Apr. 12, 2024 (KR) ........................ 10-2024-0049538

(51) Int. Cl.

*B60T 7/04* (2006.01)
*B60T 13/68* (2006.01)
*B60T 13/74* (2006.01)

(52) U.S. Cl.

CPC ............ *B60T 7/042* (2013.01); *B60T 13/686* (2013.01); *B60T 13/745* (2013.01)

(58) Field of Classification Search

CPC ...... B60T 7/042; B60T 13/686; B60T 13/745; B60T 13/146; B60T 13/662

See application file for complete search history.

(56) References Cited

U.S. PATENT DOCUMENTS

| | | | | |
|---|---|---|---|---|
| 6,135,572 | A | 10/2000 | Worsdorfer et al. | |
| 9,108,611 | B2 * | 8/2015 | Yang | B60T 7/042 |
| 10,894,535 | B2 * | 1/2021 | Ahn | B60T 13/662 |
| 2023/0071822 | A1 * | 3/2023 | Park | B60T 8/4009 |
| 2023/0391305 | A1 * | 12/2023 | Kim | B60T 13/662 |

FOREIGN PATENT DOCUMENTS

| | | | |
|---|---|---|---|
| JP | 2001-097200 | A | 4/2001 |
| KR | 10-1324995 | B1 | 11/2013 |
| KR | 10-2014-0002706 | A | 1/2014 |
| KR | 10-2023-0133072 | A | 9/2023 |

* cited by examiner

*Primary Examiner* — Joseph J Dallo

(74) *Attorney, Agent, or Firm* — WOMBLE BOND DICKINSON (US) LLP

(57) ABSTRACT

An electric brake system includes a hydraulic pressure providing unit that generates a hydraulic pressure of a pressurized medium for braking a vehicle based on an electric signal output in response to a displacement of a brake pedal, in which the hydraulic pressure providing unit includes a first hydraulic pressure supply device that generates the hydraulic pressure by operating a hydraulic piston, a hydraulic control device that controls a flow of the pressurized medium provided from the first hydraulic pressure supply device or recovered to the first hydraulic pressure supply device, a hydraulic circuit that regulates the hydraulic pressure of the pressurized medium applied to a plurality of wheel cylinders, and a second hydraulic pressure supply device that generates the hydraulic pressure by operating a hydraulic pump by the electric signal output in response to the displacement of the brake pedal.

20 Claims, 9 Drawing Sheets

ELECTRIC BRAKE SYSTEM

CROSS-REFERENCE TO RELATED APPLICATIONS

This application claims the priority of Korean Patent Application No. 10-2024-0049538 filed on Apr. 12, 2024, in the Korean Intellectual Property Office, the disclosure of which is incorporated herein by reference.

BACKGROUND

Field

The present disclosure relates to an electric brake system, and more particularly, to an electric brake system that generates braking force using an electric signal corresponding to a displacement of a brake pedal.

Description of the Related Art

Automobile is essentially equipped with a brake system to perform braking, and various types of brake systems are being proposed to secure safety of a driver and passengers.

The conventional brake system has mainly used a method of supplying a hydraulic pressure necessary for braking to a wheel cylinder using a mechanically connected booster when a driver steps on a brake pedal. However, as the market demand for implementing various braking functions elaborately in response to a vehicle's operating environment increases, recently, an electric brake system, which when a driver steps on a brake pedal, receives a driver's braking intention as an electric signal from a pedal displacement sensor detecting a displacement of the brake pedal and operates a hydraulic pressure supply device based on the received electric signal to supply a hydraulic pressure required for braking to a wheel cylinder, is becoming widely distributed.

In a normal operation mode, the electric brake system generates and provides a brake decision when a driver operates a brake pedal or a vehicle is autonomously driving as an electric signal, and electrically operates and controls a hydraulic pressure supply device based on the electric signal to form a hydraulic pressure required for braking and transmit the hydraulic pressure to a wheel cylinder. In this way, the electric brake system and its operation method electrically operate and control, so they can implement complex and diverse braking operations. However, when there is a problem with the electrical components, the hydraulic pressure required for braking may not be stably formed, which may threaten the safety of passengers.

In other words, the electric brake system enters an abnormal operation mode when one component fails or is in an uncontrollable state. In this case, a mechanism is required that directly connects the brake pedal operation of the driver to the wheel cylinder. In other words, in the abnormal operation mode of the electric brake system, the hydraulic pressure required for braking should be formed immediately as the driver applies an effort to the brake pedal, and should be directly transmitted to the wheel cylinder.

In addition, the electric brake system enters a reinforced operation mode when the output of the main components that generate the braking force is lower than the required braking force, and at this time, the braking force should be reinforced by other components.

SUMMARY

An object to be achieved by the present disclosure is to provide an electric brake system capable of effectively implementing braking in various operating situations.

Another object to be achieved by the present disclosure is to provide an electric brake system with improved braking performance and operational reliability.

Still another object to be achieved by the present disclosure is to provide an electric brake system capable of implementing braking with a simple structure and operation.

Yet another object to be achieved by the present disclosure is to provide an electric brake system capable of reducing manufacturing costs of a product while improving assembly performance and productivity of a product.

According to an aspect of the present disclosure, an electric brake system according to an exemplary embodiment of the present disclosure includes a hydraulic pressure providing unit that generates a hydraulic pressure of a pressurized medium for braking a vehicle based on an electric signal output in response to a displacement of a brake pedal, in which the hydraulic pressure providing unit includes a first hydraulic pressure supply device that generates the hydraulic pressure by operating a hydraulic piston by the electric signal output in response to the displacement of the brake pedal, a hydraulic control device that controls a flow of the pressurized medium provided from the first hydraulic pressure supply device or recovered to the first hydraulic pressure supply device, a hydraulic circuit that regulates the hydraulic pressure of the pressurized medium applied to a plurality of wheel cylinders, and a second hydraulic pressure supply device that generates the hydraulic pressure by operating a hydraulic pump by the electric signal output in response to the displacement of the brake pedal, and the second hydraulic pressure supply device is provided between the hydraulic control device and the hydraulic circuit.

The hydraulic circuit may include a first hydraulic circuit that controls the flow of the pressurized medium supplied to a first wheel cylinder and a second wheel cylinder, and a second hydraulic circuit that controls the flow of the pressurized medium supplied to a third wheel cylinder and a fourth wheel cylinder, and the second hydraulic pressure supply device may include a first hydraulic pump that provides the hydraulic pressure of the pressurized medium to the first hydraulic circuit, and a second hydraulic pump that provides the hydraulic pressure of the pressurized medium to the second hydraulic circuit.

The first hydraulic pressure supply device may include a pressure chamber in which the hydraulic piston is provided, the hydraulic control device may include a first hydraulic passage connecting the pressure chamber and the first hydraulic circuit, and a second hydraulic passage connecting the pressure chamber and the first hydraulic circuit, the first hydraulic passage may include a first valve that controls the flow of the pressurized medium, and the second hydraulic passage may include a second valve that controls the flow of the pressurized medium.

The hydraulic pressure providing unit may further include a reservoir in which the pressurized medium is stored, a first reservoir passage that connects the reservoir and the pressure chamber, a second reservoir passage that connects the reservoir and the first hydraulic pump, and a third reservoir passage that connects the reservoir and the second hydraulic pump.

The second reservoir passage may include a third valve that controls the flow of the pressurized medium, and the third hydraulic passage may include a fourth valve that controls the flow of the pressurized medium.

The hydraulic pressure providing unit may further include a first dump passage that connects the reservoir and the first hydraulic passage, and a second dump passage that connects the reservoir and the second hydraulic passage, one end of the first dump passage may be connected to the reservoir, and the other end may be connected to a rear end side of a point where the first valve is provided on the first hydraulic passage, and one end of the second dump passage may be connected to the reservoir, and the other end may be connected to a rear end side of a point where the second valve is provided on the second hydraulic passage.

The first dump passage may include a first dump valve that controls the flow of the pressurized medium, and the second dump passage may include a second dump valve that controls the flow of the pressurized medium.

The first hydraulic passage may include a fifth valve that is provided at a rear end side of a point to which the first dump passage is connected and controls the flow of the pressurized medium, and the second hydraulic passage may include a sixth valve that is provided at a rear end side of a point to which the second dump passage is connected and controls the flow of the pressurized medium.

The electric brake system may further include: an electronic control unit that controls the hydraulic pressure supply device, in which the electronic control unit may include a first electronic control unit that controls the first hydraulic pressure supply device and a second electronic control unit that controls the second hydraulic pressure supply device.

The electric brake system may further include: an electronic control unit that controls the hydraulic pressure supply device; and a pressure sensor that detects the hydraulic pressure of the pressurized medium, in which the pressure sensor may include a first pressure sensor that is provided on a front end side of a point where the first valve is provided on the first hydraulic passage or on a front end side of a point where the second valve is provided on the second hydraulic passage and detects the hydraulic pressure of the pressurized medium, and a second pressure sensor that is provided on a rear end side of a point where the fifth valve is provided on the first hydraulic passage or on a rear end side of a point where the sixth valve is provided on the second hydraulic passage and detects the hydraulic pressure of the pressurized medium, and the electronic control unit may include a first electronic control unit that receives information of the first pressure sensor and a second electronic control unit that receives information of the second pressure sensor.

The first electronic control unit may control the first and second valves, and the second electronic control unit may control the first and second hydraulic circuits, the third to sixth valves, and the first and second dump valves.

The hydraulic pressure providing unit may further include a first auxiliary hydraulic passage that connects an output terminal of the first hydraulic pump and the first hydraulic circuit, and a second auxiliary hydraulic passage that connects an output terminal of the second hydraulic pump and the second hydraulic circuit.

The hydraulic control device may further include a first bypass passage that is connected in parallel to the first valve on the first hydraulic passage, and a second bypass passage that is connected in parallel to the second valve on the second hydraulic passage, the first bypass passage may include a first check valve that allows only the flow of the pressurized medium discharged from the pressure chamber to the first hydraulic circuit, and the second bypass passage may further include a second check valve that allows only the flow of the pressurized medium discharged from the pressure chamber to the second hydraulic circuit.

The first hydraulic circuit may include a first inlet valve and a second inlet valve that are provided on inlet sides of the first wheel cylinder and the second wheel cylinder, respectively, to control the flow of pressurized medium, and a first outlet valve and a second outlet valve that are provided on outlet sides of the first wheel cylinder and the second wheel cylinder, respectively, to control the flow of the pressurized medium discharged to the reservoir, the second hydraulic circuit may include a third inlet valve and a fourth inlet valve that are provided on inlet sides of the third wheel cylinder and the fourth wheel cylinder, respectively, to control the flow of pressurized medium, and a third outlet valve and a fourth outlet valve that are provided on outlet sides of the third wheel cylinder and the fourth wheel cylinder, respectively, to control the flow of the pressurized medium discharged to the reservoir, and the hydraulic pressure providing unit may include a discharge passage that connects the reservoir and the first to fourth outlet valves.

The first to fourth valves may be provided as a normal closed type that operates to open the valves when receiving the electric signal, and the fifth and sixth valves may be provided as a normal opened type that operates to close the valves when receiving the electric signal.

The electric brake system may further include: a pedal unit that is connected to the brake pedal and operates by a driver's effort and physically separated from the hydraulic pressure providing unit, in which the pedal unit may further include a simulation piston that is displaced by an operation of the brake pedal, a simulation chamber whose volume is variable by the displacement of the simulation piston, and a pedal simulator that includes an elastic member that is provided in the simulation chamber, compressed by the displacement of the simulation piston, and provides pedal feeling through an elastic restoring force generated from the compression to generate a reaction force to the effort of the brake pedal and provide the pedal feeling to the driver.

According to another aspect of the present disclosure, as a method of operating the electric brake system, a normal operation mode may include a first braking mode in which the hydraulic piston of the first hydraulic pressure supply device moves forward and the pressurized medium accommodated in the pressure chamber in which the hydraulic piston is provided is transmitted to the plurality of wheel cylinders, and a second braking mode in which the hydraulic pump of the second hydraulic pressure supply device operates and the pressurized medium accommodated in the reservoir is transmitted to the plurality of wheel cylinders.

The second braking mode may additionally operate after the operation of the first braking mode when the braking force of the first braking mode is insufficient.

The electric brake system may include an abnormal operation mode that is switched when the braking by the first hydraulic pressure supply device is impossible, and the abnormal operation mode may operate the hydraulic pump of the second hydraulic pressure supply device so that the pressurized medium included in the reservoir is transmitted to the plurality of wheel cylinders.

The abnormal operation mode may operate so that the first and second valves are closed, and the first and second hydraulic pumps may operate so that the pressurized medium accommodated in the reservoir is transmitted to the plurality of wheel cylinders.

According to the present exemplary embodiment, it is possible to provide the electric brake system capable of effectively implementing braking even in various operating situations.

According to the present exemplary embodiment, it is possible to provide the electric brake system with improved braking performance and operational reliability.

According to the present exemplary embodiment, it is possible to provide the electric brake system capable of implementing the braking with a simple structure and operation.

According to the present exemplary embodiment, it is possible to provide the electric brake system capable of reducing the manufacturing costs of the product while improving the assembly performance and productivity of the product.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
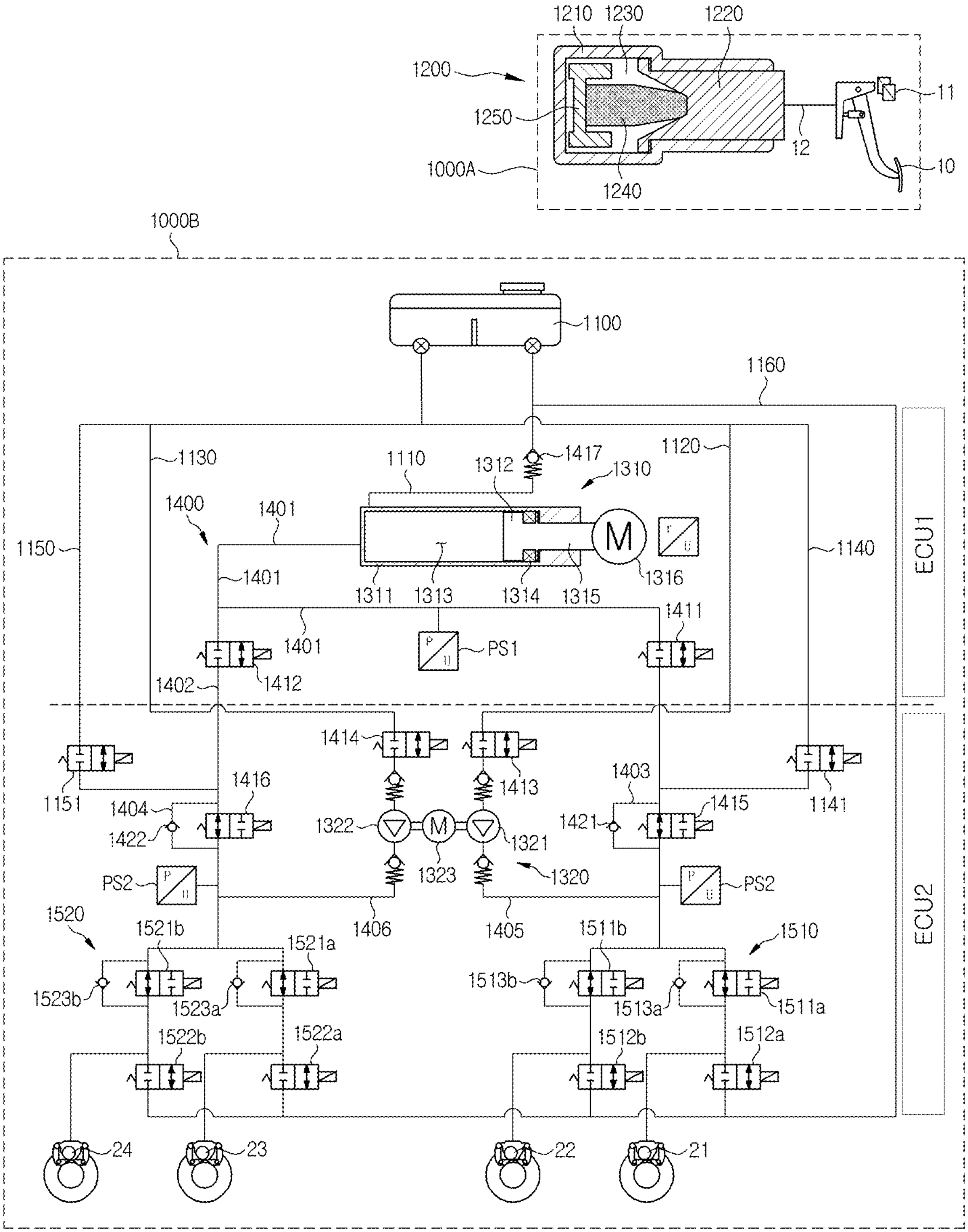
FIG. 1 is a hydraulic circuit diagram illustrating an electric brake system according to an exemplary embodiment of the present disclosure.

Hereinafter, the exemplary embodiment of the present disclosure will be described with reference to the accompanying drawings and exemplary embodiments as follows. Scales of components illustrated in the accompanying drawings are different from the real scales for the purpose of description, so that the scales are not limited to those illustrated in the drawings.

Hereinafter, the present exemplary embodiments will be described in detail with reference to the accompanying drawings. The following exemplary embodiments are presented to sufficiently convey the idea of the present disclosure to those skilled in the art. The present disclosure is not limited only to the exemplary embodiments to be presented below, but may be embodied in other forms. In order to clarify the present disclosure, parts unrelated to the description may be omitted, and a size of components may be slightly exaggerated to aid understanding.

FIG. 1 is a hydraulic circuit diagram illustrating an electric brake system 1000 according to an exemplary embodiment of the present disclosure.

Referring to FIG. 1, the electric brake system 1000 according to an exemplary embodiment of the present disclosure may include a pedal unit 1000A that operates by an effort of a brake pedal 10 of a driver and a hydraulic pressure providing unit 1000B that generates and provides a hydraulic pressure of a pressurized medium for braking based on an electric signal output according to a displacement of the brake pedal 10, and the pedal unit 1000A and the hydraulic pressure providing unit 1000B may be physically separated from each other.

As the pedal unit 1000A and the hydraulic pressure providing unit 1000B are physically separated from each other and provided in a vehicle, the degree of freedom in installing the electric brake system 1000 may be improved. For example, the pedal unit 1000A is disposed close to a passenger space of the vehicle by considering that it is connected to the brake pedal 10 and operates, and the hydraulic pressure providing unit 1000B is installed in an area where there is room for space, such as an engine room or a luggage room of the vehicle or is installed in a space where a passage for transmitting a hydraulic pressure of a pressurized medium may be efficiently disposed, thereby facilitating an installation operation of the electric brake system 1000 and improving space utilization of the vehicle.

Furthermore, as autonomous driving technology of today's vehicles is gradually developed, the braking determination of the vehicle is generated as an electric signal by a camera, a radar, etc., and the hydraulic pressure of the pressurized medium for braking the vehicle is automatically formed based on the generated electric signal, so that the braking of the vehicle is required to occur regardless of the operation of the brake pedal 10. Accordingly, the electric brake system 1000 according to the present exemplary embodiment physically separates the pedal unit 1000A connected to the brake pedal 10 and the hydraulic pressure providing unit 1000B generating the hydraulic pressure of the pressurized medium for braking the vehicle to block the linkage of the brake pedal 10 when braking in an autonomous driving situation of the vehicle, thereby preventing the operational confusion of the driver and promoting a comfortable passenger space.

The pedal unit 1000A operates by the effort of the brake pedal 10 of the driver and includes a pedal simulator 1200 that provides the driver with pedal feeling.

Specifically, when the driver applies the effort to the brake pedal 10 for the braking operation, the pedal simulator 1200 is installed to provide the driver with a reaction force to the effort, thereby providing the stable pedal feeling.

The pedal simulator 1200 may include a cylinder body 1210, a simulation piston 1220 that is connected to the brake pedal 10 and is provided to be displaceable by the operation of the brake pedal 10, a simulation chamber 1230 that is provided on the inside of the cylinder body 1210 and whose volume is variable by the displacement of the simulation piston 1220, and an elastic member 1240 that is provided in the simulation chamber 1230 and provides the pedal feeling through an elastic restoring force generated when compressed.

The cylinder body 1210 may have the simulation chamber 1230 formed on the inside, and the simulation piston 1220 may be connected to the brake pedal 10 via an input rod 12 and may be accommodated in the simulation chamber 1230 so as to be reciprocally movable. The simulation chamber 1230 is provided with an elastic member 1240, so that the elastic member 1240 may be compressed by the forward movement of the simulation piston 1220 (left direction based on FIG. 1), and restored to its original state by the backward movement (right direction based on FIG. 1) of the simulation piston 1220.

Specifically, one side of the elastic member 1240 may be installed in contact with a front surface (left surface based on FIG. 1) of the simulation piston 1220, and may be made of an elastic material such as compressible and expandable rubber. The other side of the elastic member 1240 may be provided in direct contact with an inner end of the cylinder body 1210, or the elastic member 1240 may be provided in a state in which it is partially fixed to a support member 1250 installed in an inner end of the cylinder body 1210 as illustrated in FIG. 1. The elastic member 1240 may include a cylindrical body part, at least a portion of which is inserted into and supported on the support member 1250, and a tapered part, at least a portion of which is inserted into and supported on a front surface of the simulation piston 1220, and whose diameter gradually decreases toward the rear (right side based on FIG. 1). At least a portion of both ends of the elastic member 1240 may be inserted into the simulation piston 1220 and the support member 1250, respectively, so the elastic member 1240 may be stably supported, and the elastic restoring force may change according to the degree of effort of the brake pedal 10 by the tapered part to provide the stable and familiar pedal feeling to the driver.

Describing the pedal simulation operation by the pedal simulator 1200, as the driver operates the brake pedal 10, the simulation piston 1220 compresses the elastic member 1240 while moving forward. The compressed elastic member 1240 generates the elastic restoring force, and the elastic restoring force may be provided to the driver as the pedal feeling. Thereafter, when the driver releases the effort of the brake pedal 10, the simulation piston 1220 and the elastic member 1240 may return to their original shape and position by the elastic restoring force of the elastic member 1240, and thus, return to a braking preparation state.

The simulation chamber 1220 may be provided in a state where it is filled with lubricating oil, etc., so the wear of the components may be reduced and noise and vibration generated during operation may be suppressed despite the repetitive operation of the brake pedal 10 and the simulation piston 1220.

The hydraulic pressure providing unit 1000B is designed to generate and provide the hydraulic pressure of the pressurized medium for braking the vehicle based on the electric signal output in response to the displacement of the brake pedal 10.

The hydraulic pressure providing unit 1000B includes a reservoir 1100 in which the pressurized medium is stored, a hydraulic pressure supply device 1300 that receives a driver's braking intention as an electric signal by a pedal displacement sensor 11 detecting the displacement of the brake pedal 10 and generates the hydraulic pressure of the pressurized medium through mechanical operation, a hydraulic control device 1400 that controls the hydraulic pressure of the pressurized medium discharged from the hydraulic pressure supply device 1300 or recovered to the hydraulic pressure supply device 1300, hydraulic circuits 1510 and 1520 that include wheel cylinders 21, 22, 23, and 24 receiving the hydraulic pressure of the pressurized medium to perform braking of each wheel RR, RL, FR, and FL, and an electronic control unit that controls the hydraulic pressure supply device 1300 and various valves based on the hydraulic pressure information and the pedal displacement information.

The reservoir 1100 may accommodate and store the pressurized medium inside. The reservoir 1100 may be connected to multiple components such as the hydraulic pressure supply device 1300 and the first and second hydraulic circuits 1510 and 1520 to supply or receive the pressurized medium. The reservoir 1100 may be partitioned by providing a partition wall inside, and the plurality of reservoir chambers partitioned by the partition wall are respectively connected to different components, so even when the flow of the pressurized medium is concentrated in one component, the pressurized medium may be stably supplied to other components.

The hydraulic pressure supply device 1300 is provided to receive the driver's braking intention as the electric signal from the pedal displacement sensor 11 detecting the displacement of the brake pedal 10 and to generate the hydraulic pressure of the pressurized medium through the mechanical operation. The hydraulic pressure supply device includes a first hydraulic pressure supply device 1310 that generates the hydraulic pressure by operating a hydraulic piston 1312 by an electric signal output in response to the displacement of the brake pedal 10 and a second hydraulic pressure supply device 1320 that generates the hydraulic pressure by operating hydraulic pumps 1321 and 1322 by the electric signal output in response to the displacement of the brake pedal 10.

The first hydraulic pressure supply device 1310 includes a cylinder block 1311 in which the pressurized medium is accommodated, a hydraulic piston 1312 that is accommodated in the cylinder block 1311, a sealing member 1314 that is provided between the hydraulic piston 1312 and the cylinder block 1311 to seal the pressure chamber 1313, a first motor 1316 that generates rotational force by the electric signal of the pedal displacement sensor 11, a power conversion unit (not illustrated) that converts a rotational motion of the first motor 1316 into a linear motion and transmits the linear motion to the hydraulic piston 1312, and a drive shaft 1315 that transmits the power output from the power conversion unit to the hydraulic piston 1312.

The pressure chamber 1313 has the hydraulic piston 1312 provided therein and is connected to a first hydraulic passage

1401 and a second hydraulic passage 1402 to be described below through a communication hole formed in the cylinder block 1311.

The first motor 1316 is provided to generate the driving force of the hydraulic piston 1312 by an electric signal output from a first electronic control unit ECU1. The first motor 1316 may be provided including a stator and a rotor, and may provide power to generate the displacement of the hydraulic piston 1312 by rotating in a forward or reverse direction. A rotational angular velocity and rotational angle of the first motor 1316 may be precisely controlled by a motor control sensor. Since a motor is a widely known technology, a detailed description thereof will be omitted.

The power conversion unit (not illustrated) is provided to convert the rotational force of the first motor 1316 into the linear motion. The power conversion unit may be provided in a structure that includes, for example, a worm shaft (not illustrated), a worm wheel (not illustrated), and the drive shaft 1315. The worm shaft may be formed integrally with a rotating shaft of the motor, and a worm may be formed on an outer circumferential surface thereof to engage with the worm wheel and rotate the worm wheel. The worm wheel may be connected to engage with the drive shaft 1315 to move the drive shaft 1315 linearly, and the drive shaft 1315 may be connected to the hydraulic piston 1312 and operate integrally, thereby allowing the hydraulic piston 1312 to slide within the cylinder block 1311.

The operation of the first hydraulic pressure supply device 1310 will be described. When the displacement of the brake pedal 10 is detected by the pedal displacement sensor 11, the detected signal is transmitted to the first electronic control unit ECU1 to be described below, and the first electronic control unit ECU1 drives the first motor 1316 to rotate the worm shaft in one direction. The rotational power of the worm shaft is transmitted to the drive shaft 1315 via the worm wheel, and the hydraulic piston 1312 connected to the drive shaft 1315 may generate the hydraulic pressure in the pressure chamber 1313 as it moves forward within the cylinder block 1311.

On the other hand, when the effort of the brake pedal 10 is released, the first electronic control unit ECU1 drives the first motor 1316 to rotate the worm shaft in the opposite direction. Accordingly, the worm wheel also rotates in the opposite direction, and the hydraulic piston 1312 connected to the drive shaft 1315 moves backward within the cylinder block 1311, thereby generating a negative pressure in the pressure chamber 1313.

In this way, the hydraulic pressure supply device 1300 may generate the hydraulic pressure or negative pressure in the pressure chamber 1313 depending on a rotational direction of the worm shaft driven by the first motor 1316. Whether to implement braking by delivering hydraulic pressure or releasing the braking using negative pressure may be determined by controlling the valves. A detailed description thereof will be described below.

Meanwhile, the power conversion unit according to the present exemplary embodiment is not limited to any one structure as long as it may convert the rotational motion of the first motor 1316 into the linear motion of the hydraulic piston 1312, and should be understood in the same way even when it is composed of devices of various structures and methods.

The second hydraulic pressure supply device 1320 includes a first hydraulic pump 1321 and a second hydraulic pump 1322, which are provided as a pair to generate the hydraulic pressure of the pressurized medium, and a second motor 1323 that operates the first and second hydraulic pumps 1321 and 1322. A suction side of the first hydraulic pump 1321 is connected to the reservoir 1100 through the second reservoir passage 1120 to be described below, and a discharge side of the first hydraulic pump 1321 is connected to the first hydraulic circuit 1510 to be described below through the first auxiliary hydraulic passage 1405 to be described below. Similarly, a suction side of the second hydraulic pump 1322 is connected to the reservoir 1100 through a third reservoir passage 1130 to be described below, and a discharge side of the second hydraulic pump 1322 is connected to the second hydraulic circuit 1520 to be described below through the second auxiliary hydraulic passage 1406 to be described below.

The second hydraulic pressure supply device 1320 is provided between the hydraulic control device 1400 to be described below and the hydraulic circuits 1510 and 1520 to be described below. In this case, being located between the hydraulic control device 1400 and the hydraulic circuits 1510 and 1520 means that the second hydraulic pressure supply device 1320 is located between an uppermost portion of the hydraulic control device 1400 and lowermost portions of the hydraulic circuits 1510 and 1520. That is, as illustrated in FIG. 1, the second hydraulic pressure supply device 1320 may be located below a first valve 1411 and a second valve 1412, which are components of the hydraulic control device 1400, but located above the first hydraulic circuit 1510 and the second hydraulic circuit 1520. Accordingly, the second hydraulic pressure supply device 1320 may be disposed in a space-intensive manner inside the vehicle. In addition, a plurality of valves is present in the first hydraulic passage 1401 and the second hydraulic passage 1402 to be described below or other passages are joined to transmit the pressurized media accommodated in the reservoir to the first hydraulic circuit 1510 and the second hydraulic circuit 1520 in various ways, and the second hydraulic pressure supply device 1320 is provided between the hydraulic control device 1400 and the hydraulic circuits 1510 and 1520, so each component of the electric brake system 1000 may implement a simple structure and operation.

The first hydraulic pump 1321 may have a check valve provided on the suction side and the discharge side for one-way flow of the pressurized medium so that the pressurized medium is pressurized from a suction end through the first hydraulic pump 1321 and then transmitted to a discharge end. In addition, the first hydraulic pump 1321 may have an orifice provided on the discharge side to reduce pulsation caused by the hydraulic pressure of the pressurized medium formed while passing through the first hydraulic pump 1321. Similarly, the second hydraulic pump 1322 may have check valves provided on the suction side and the discharge side for one-way flow of the pressurized medium so that the pressurized medium is pressurized from the suction end through the second hydraulic pump 1322 and then transmitted to the discharge side, and the second hydraulic pump 1322 may have an orifice provided on the discharge side to reduce pulsation caused by the hydraulic pressure of the pressurized medium formed while passing through the second hydraulic pump 1322.

The operation of the second hydraulic pressure supply device 1320 will be described. When the electric brake system 1000 is in normal operation mode, the first hydraulic pressure supply device 1310 operates to generate the braking force. However, when additional braking force is to be generated together with the first hydraulic pressure supply device 1310 or when there is a problem with the first hydraulic pressure supply device 1310 and thus the first hydraulic pressure supply device 1310 needs to be replaced to generate braking force, a second electronic control unit ECU2 to be described below drives the second motor 1323 to operate the first and second hydraulic pumps 1321 and 1322, and controls various valves to transmit the pressurized medium accommodated in the reservoir to the first to fourth wheel cylinders 21, 22, 23, and 24 through the first and second hydraulic pumps 1321 and 1322. In this way, a detailed description of the case where the operation of the second hydraulic pressure supply device 1320 is required and the method of controlling the valves accordingly will be described below.

The hydraulic control device 1400 may be provided to control the flow of the pressurized medium from the first hydraulic pressure supply device 1310 toward each of the wheel cylinders 21, 22, 23, and 24 or the flow of the pressurized medium recovered from each of the wheel cylinders 21, 22, 23, and 24 to the first hydraulic pressure supply device 1310. To this end, the hydraulic control device 1400 includes a plurality of passages and valves so as to smoothly control the flow of the pressurized medium or the hydraulic pressure.

The hydraulic circuits 1510 and 1520 are configured to control the hydraulic pressure of the pressurized medium applied to the plurality of wheel cylinders. The first hydraulic circuit 1510 for controlling the flow of the pressurized medium may be provided between the hydraulic control device 1400 and any two of the plurality of wheel cylinders, and the second hydraulic circuit 1520 for controlling the flow of the pressurized medium may be provided between the hydraulic control device 1400 and the other two of the plurality of wheel cylinders.

The first hydraulic passage 1401 may be provided to connect the pressure chamber 1313 and the first hydraulic circuit 1510 so as to communicate with the pressure chamber 1313, and the second hydraulic passage 1402 may be provided to connect the pressure chamber 1313 and the second hydraulic circuit 1520 so as to communicate with the pressure chamber 1313. In this case, the second hydraulic passage 1402 may be provided so that one end is branched from the first hydraulic passage 1401 and the other end is connected to the second hydraulic circuit 1520, and conversely, the first hydraulic passage 1401 may be provided so that one end is branched from the second hydraulic passage 1402 and the other end is connected to the first hydraulic circuit 1510.

The first hydraulic passage 1401 may be provided with a first valve 1411 for controlling the flow of the pressurized medium. The first valve 1411 may be provided as a bidirectional control valve for controlling the flow of the pressurized medium transmitted along the first hydraulic passage 1401. The second hydraulic passage 1402 may be provided with the second valve 1412 for controlling the flow of the pressurized medium. Similar to the first valve 1411, the second valve 1412 may be provided as a bidirectional control valve that controls the flow of the pressurized medium transmitted along the second hydraulic passage 1402.

When the first valve 1411 and the second valve 1412 are in a closed state at ordinary times and then receive the electric signal from the first electronic control unit ECU1, the first valve 1411 and the second valve 1412 may be provided as a solenoid valve of a normal closed type that operates to open the valves.

The hydraulic control device 1400 may be configured such that the hydraulic pressure formed in the pressure chamber 1313 according to the forward movement of the hydraulic piston 1312 through the arrangement of the hydraulic passages and valves may be transmitted to the first hydraulic circuit 1510 through the first hydraulic passage 1401 and to the second hydraulic circuit 1520 through the second hydraulic passage 1402.

Conversely, the negative pressure formed in the pressure chamber 1313 according to the backward movement of the hydraulic piston 1312 may recover the pressurized medium provided to the first hydraulic circuit 1510 to the pressure chamber 1313 through the first hydraulic passage 1401, and recover the pressurized medium provided to the second hydraulic circuit 1520 to the pressure chamber 1313 through the second hydraulic passage 1402.

The hydraulic pressure providing unit 1000B may include auxiliary hydraulic passages 1405 and 1406 that connect the hydraulic pumps 1321 and 1322 and the hydraulic circuits 1510 and 1520, and specifically, may include a first auxiliary hydraulic passage 1405 that connects an output terminal of the first hydraulic pump 1321 and the first hydraulic circuit 1510, and a second auxiliary hydraulic passage 1406 that connects an output terminal of the second hydraulic pump 1322 and the second hydraulic circuit 1520.

The hydraulic pressure providing unit 1000B may include dump passages 1140 and 1150 that connect the reservoir 1100 and the first and second hydraulic passages 1401 and 1402, and specifically, may include the first dump passage 1140 that connects the reservoir 1100 and the first hydraulic passage 1401 and the second dump passage 1150 that connects the reservoir 1100 and the second hydraulic passage 1402. In this case, the first dump passage 1140 may be configured such that one end is connected to the reservoir 1100 and the other end is connected to the rear end side of the point where the first valve 1411 is provided on the first hydraulic passage 1401, and the second dump passage 1150 may be configured such that one end is connected to the reservoir 1100 and the other end is connected to a rear end side of a point where the second valve 1412 is provided on the second hydraulic passage 1402.

In the present disclosure, the expressions of the front end and rear end of a specific point on the passage are used. In this case, the front end and rear end are referred to as the front end side and the rear end side, respectively, based on the direction in which the pressurized medium flows from the reservoir side to the wheel cylinder side. For example, the front end side of the point where the first valve 1411 is provided on the first hydraulic passage 1401 refers to the wheel cylinders 21, 22, 23, and 24 based on the first valve 1411 on the first hydraulic passage 1401 based on FIG. 2, and the rear end side of the point where the first valve 1411 is provided on the first hydraulic passage 1401 refers to the reservoir 1100 based on the first valve 1411 on the first hydraulic passage 1401 based on FIG. 2.

The first dump valve 1141 for controlling the flow of the pressurized medium may be provided in the first dump passage 1140. The first dump valve 1141 may be provided as the bidirectional control valve for controlling the flow of the pressurized medium transmitted along the first dump passage 1140. The second dump valve 1151 for controlling the flow of the pressurized medium may be provided in the second dump passage 1150. Similar to the first dump valve 1141, the second dump valve 1151 may be provided as a bidirectional control valve that controls the flow of the pressurized medium transmitted along the second dump passage 1150.

The first valve 1411 and the second valve 1412 may be provided as a solenoid valve of a normal closed type that when the first valve 1141 and the second valve 1151 are in a closed state at ordinary times and then receive the electric signal from the second electronic control unit ECU2, operates to be opened.

The first hydraulic passage 1401 may be provided with a fifth valve 1415 that is provided on the rear end side of the point to which the first dump passage 1140 is connected and controls the flow of the pressurized medium. The fifth valve 1415 may be provided as a bidirectional control valve for controlling the flow of the pressurized medium transmitted along the first hydraulic passage 1401. The second hydraulic passage 1402 may be provided with a sixth valve 1416 that is provided on the rear end side of the point to which the second dump passage 1150 is connected and controls the flow of the pressurized medium. Similar to the fifth valve 1415, the sixth valve 1416 may be provided as a bidirectional control valve that controls the flow of the pressurized medium transmitted along the second hydraulic passage 1402.

The fifth valve 1415 and the sixth valve 1416 may be provided as a solenoid valve of a normal opened type that when the fifth valve 1415 and the sixth valve 1416 are in an opened state at ordinary times and then receive the electric signal from the second electronic control unit ECU2, operates to close the valves. Therefore, when the electric brake system 1000 is in normal operation mode and the first hydraulic pressure supply device 1310 operates to generate the braking force, the fifth valve 1415 and the sixth valve 1416 are opened so that the pressurized medium accommodated in the pressure chamber 1313 is transmitted to the first to fourth wheel cylinders 21, 22, 23, and 24, but when there is a problem with the first hydraulic pressure supply device 1310 or the second hydraulic pressure supply device 1320 operates to generate the additional braking force, the second electronic control unit ECU2 closes the fifth valve 1415 and the sixth valve 1416 so that the pressurized medium accommodated in the pressure chamber 1313 is not transmitted to the first to fourth wheel cylinders 21, 22, 23, and 24.

The hydraulic control device 1400 may include a first bypass passage 1403 that is connected in parallel to the first valve 1411 on the first hydraulic passage 1401, and a second bypass passage 1404 that is connected in parallel to the second valve 1412 on the second hydraulic passage 1402. In this case, the first bypass passage 1403 may include a first check valve 1421 that only allows the flow of the pressurized medium discharged from the pressure chamber 1313 to the first hydraulic circuit 1510, and the second bypass passage 1404 may include a second check valve 1422 that only allows the flow of the pressurized medium discharged from the pressure chamber 1313 to the second hydraulic circuit 1520. Therefore, the pressurized medium discharged from the pressure chamber 1313 and flowing through the first hydraulic passage 1401 and the second hydraulic passage 1402 may be bypassed through the first bypass passage 1403 and the second bypass passage 1404 and communicate with the first to fourth wheel cylinders 21, 22, 23, and 24.

The first hydraulic circuit 1510 of the hydraulic control device 1400 may control the hydraulic pressure of the first and second wheel cylinders 21 and 22, which are two wheel cylinders among the four wheels RR, RL, FR, and FL, and the second hydraulic circuit 1520 may control the hydraulic pressure of the other two wheel cylinders, which are the third and fourth wheel cylinders 23 and 24.

The first hydraulic circuit 1510 may receive the hydraulic pressure through the first hydraulic passage 1401 or the first auxiliary hydraulic passage 1405, and may discharge the hydraulic pressure to the first hydraulic pressure supply device 1310 through the first hydraulic passage 1401 or may discharge the hydraulic pressure to the reservoir 1100 through the first dump passage 1140. In addition, the second hydraulic circuit 1520 may receive the hydraulic pressure through the second hydraulic passage 1402 or the second auxiliary hydraulic passage 1406, and may discharge the hydraulic pressure to the first hydraulic pressure supply device 1310 through the second hydraulic passage 1402 or may discharge the hydraulic pressure to the reservoir 1100 through the second dump passage 1150. However, the connection of the hydraulic passage illustrated in FIG. 1 is an example to help understand the present disclosure and is not limited to the structure, and it should be understood that the same may be applied to various methods and structures in which the pressurized medium pressurized through the first hydraulic pressure supply device 1310 and the second hydraulic pressure supply device 1320 may be transmitted to the first hydraulic circuit 1510 or the second hydraulic circuit 1520 or transmitted from the first hydraulic circuit 1510 or the second hydraulic circuit 1520 to the first hydraulic pressure supply device 1310 and the reservoir 1100.

The first and second hydraulic circuits 1510 and 1520 may include first to fourth inlet valves 1511*a*, 1511*b*, 1521*a*, and 1521*b* to control the flow and hydraulic pressure of the pressurized medium transmitted to the first to fourth wheel cylinders 21, 22, 23, and 24, respectively. The first to fourth inlet valves 1511*a*, 1511*b*, 1521*a*, and 1521*b* are disposed on upstream sides of the first to fourth wheel cylinders 21, 22, 23, and 24, respectively. The first to fourth inlet valves 1511*a*, 1511*b*, 1521*a*, and 1521*b* may be provided as solenoid valves of a normal opened type that when the first to fourth inlet valves 1511*a*, 1511*b*, 1521*a*, and 1521*b* are opened at ordinary times and receive the electric signals from the electronic control unit ECU1 and ECU2, operates to close the valves.

The first and second hydraulic circuits 1510 and 1520 may include third to sixth check valves 1513*a*, 1513*b*, 1523*a*, and 1523*b* connected in parallel to the first to fourth inlet valves 1511*a*, 1511*b*, 1521*a*, and 1521*b*. The third to sixth check valves 1513*a*, 1513*b*, 1523*a*, and 1523*b* may be provided in a bypass passage connecting the front and rear of the first to fourth inlet valves 1511*a*, 1511*b*, 1521*a*, and 1521*b* on the first and second hydraulic circuits 1510 and 1520, and may only allow the flow of the pressurized medium from each wheel cylinder 20 to the hydraulic pressure supply device 1300, and block the flow of the pressurized medium from the hydraulic pressure supply device 1300 to the wheel cylinder 20. The hydraulic pressure of the pressurized medium applied to each wheel cylinder 20 may be quickly discharged by the third to sixth check valves 1513*a*, 1513*b*, 1523*a*, and 1523*b*, and even when the first to fourth inlet valves 1511*a*, 1511*b*, 1521*a*, and 1521*b* do not operate normally, the hydraulic pressure of the pressurized medium applied to the wheel cylinder 20 may smoothly return to the hydraulic pressure supply device 1300.

The first and second hydraulic circuits 1510 and 1520 may have the first to fourth outlet valves 1512*a*, 1512*b*, 1522*a*, and 1522*b* for controlling the flow of pressurized medium discharged from the first to fourth wheel cylinders 21, 22, 23, and 24 to the reservoir 1100 to improve performance when the wheel cylinder 20 is released from the braking. The first and second outlet valves 1512*a* and 1512*b* are provided on the discharge side of the first and second wheel cylinders 21 and 22, respectively, to control the flow of the pressurized medium transmitted from the first and second wheel cylinders 21 and 22 to the reservoir 1100. To this end, a discharge passage 1610 for connecting the downstream side of the first and second outlet valves 1512*a* and 1512*b* and the reservoir may be provided. Similarly, the third and fourth outlet valves 1522*a* and 1522*b* are provided on the discharge side of the third and fourth wheel cylinders 23 and 24, respectively, to control the flow of the pressurized medium transmitted from the third and fourth wheel cylinders 23 and 24 to the reservoir 1100. To this end, the discharge passage may also be connected to the downstream side of the third and fourth outlet valves 1522*a* and 1522*b*, so that the downstream side of the third and fourth outlet valves 1522*a* and 1522*b* may be connected to the reservoir 1100.

The first to fourth outlet valves 1512*a*, 1512*b*, 1522*a*, and 1522*b* may selectively release the hydraulic pressure of the pressurized medium applied to the wheel cylinders 21, 22, 23, and 24 of which the braking force should be released for the stable operation of the vehicle, such as in the ABS braking mode of the vehicle, and transmit the hydraulic pressure to the reservoir 1100.

Meanwhile, in the case where the normal operation is impossible due to the failure of the hydraulic pressure supply device 1300, etc., the hydraulic pressure of the pressurized medium applied to the wheel cylinder 20 is required to be removed to prevent a safety accident, such as a rear-end collision with a rear-end vehicle. The first to fourth outlet valves 1512*a*, 1512*b*, 1522*a*, and 1522*b* may be provided as the solenoid valve of the normal opened type that when the first to fourth outlet valves 1512*a*, 1512*b*, 1522*a*, and 1522*b* are in an opened state at ordinary times and then receive the electric signal from the second electronic control unit ECU2, operates to close the valves. Accordingly, when the hydraulic pressure providing unit 1000B, including the first hydraulic pressure supply device 1310 and the second hydraulic pressure supply device 1320, is inoperable, the first to fourth outlet valves 1512*a*, 1512*b*, 1522*a*, and 1522*b* are disposed in an opened state, so the hydraulic pressure of the pressurized medium applied to the first to fourth wheel cylinders 21, 22, 23, and 24 is discharged to the reservoir 1100, thereby preventing safety accidents such as collisions in advance.

The hydraulic pressure providing unit 1000B may include a first reservoir passage 1110 that connects the reservoir and the pressure chamber 1313, a second reservoir passage 1120 that connects the reservoir and the first hydraulic pump 1321, and a third reservoir passage 1130 that connects the reservoir and the second hydraulic pump 1322.

The first reservoir passage 1110 may be provided with a third valve 1413 for controlling the flow of the pressurized medium. The third valve 1413 may be provided as a bidirectional control valve for controlling the flow of the pressurized medium transmitted along the first reservoir passage 1110. The second reservoir passage 1120 may be provided with a fourth valve 1414 for controlling the flow of the pressurized medium. Similar to the third valve 1413, the fourth valve 1414 may be provided as a bidirectional control valve that controls the flow of the pressurized medium transmitted along the second reservoir passage 1120.

The third valve 1413 and the fourth valve 1414 may be provided as a solenoid valve of a normal closed type that when the third valve 1413 and the fourth valve 1414 are in a closed state at ordinary times and then receive the electric signal from the first electronic control unit ECU1, operates to open the valves.

The hydraulic pressure providing unit 1000B may include the electronic control units ECU1 and ECU2 that control the hydraulic pressure supply device and various valves. Specifically, the electronic control units ECU1 and ECU2 may include a first electronic control unit ECU1 that controls the first hydraulic pressure supply device 1310 and a second electronic control unit ECU2 that controls the second hydraulic pressure supply device 1320. In this case, the first electronic control unit ECU1 may control the first and second valves 1412, and the second electronic control unit ECU2 may control the third to sixth valves 1416, the first and second dump valves 1151, and the valves provided in the first and second hydraulic circuits 1510 and 1520.

However, the control targets of the first electronic control unit ECU1 and the second electronic control unit ECU2 are not limited to the above description. For example, the first electronic control unit ECU1 controls the hydraulic pressure supply device and various valves, but when a problem occurs in the first electronic control unit ECU1, the second electronic control unit ECU2 is provided to subsidiarily control the hydraulic pressure supply device and various valves, and the control targets of the first electronic control unit ECU1 and the second electronic control unit ECU2 may be variously distinguished or overlapped.

The hydraulic pressure providing unit 1000B may include pressure sensors PS1 and PS2 for detecting the hydraulic pressure of the pressurized medium. Specifically, the pressure sensor may include a first pressure sensor PS1 that is provided at a front end side of a point where the first valve 1411 is provided on the first hydraulic passage 1401 or a front end side of a point where the second valve 1412 is provided on the second hydraulic passage 1402 to detect the hydraulic pressure of the pressurized medium, and a second pressure sensor PS2 that is provided at a rear end side of a point where the fifth valve 1415 is provided on the first hydraulic passage 1401 or a rear end side of a point where the sixth valve 1416 is provided on the second hydraulic passage 1402 to detect the hydraulic pressure of the pressurized medium. In this case, two second pressure sensors PS2 may be provided and may be provided on the rear end side of the point where the fifth valve 1415 is provided on the first hydraulic passage 1401, and may also be provided on the rear end side of the point where the sixth valve 1416 is provided on the second hydraulic passage 1402.

The first pressure sensor PS1 may transmit the detected pressure value information to the first electronic control unit ECU1, and the second pressure sensor PS2 may transmit the detected pressure value information to the second electronic control unit ECU2. The first and second electronic control units ECU1 and ECU2 may receive the hydraulic pressure value information of the hydraulic circuits 1510 and 1520 from the first and second pressure sensors PS1 and PS2, respectively, and control the hydraulic pressure supply device and various valves based on the received hydraulic pressure value information, thereby assisting the autonomous driving of the vehicle.

Hereinafter, a method of operating an electric brake system 1000 according to an exemplary embodiment of the present disclosure will be described.

The electric brake system 1000 according to an exemplary embodiment of the present disclosure may include a normal operation mode in which the braking is performed by operating normally without any failure or abnormality in various components, and an abnormal operation mode in which the braking of the vehicle is performed in a state in which the failure or abnormality in the brake system occurs.

Hereinafter, a normal operation mode of the electric brake system 1000 according to an exemplary embodiment of the present disclosure will be described.

The normal operation mode of the electric brake system 1000 according to an exemplary embodiment of the present disclosure may include a first braking mode in which the braking force is generated through the first hydraulic pressure supply device 1310, and a second braking mode in which the braking force is generated through the second hydraulic pressure supply device 1320 together with the first hydraulic pressure supply device 1310. Specifically, in the first braking mode, the hydraulic piston 1312 of the first hydraulic pressure supply device 1310 moves forward, and thus, the pressurized medium accommodated in the pressure chamber 1313 in which the hydraulic piston 1312 is provided is primarily transmitted to the plurality of wheel cylinders 21, 22, 23, and 24, and in the second braking mode, the hydraulic pump of the second hydraulic pressure supply device 1320 operates, and thus, the pressurized medium accommodated in the reservoir is secondarily transmitted to the plurality of wheel cylinders 21, 22, 23, and 24. In particular, the second braking mode may additionally operate after the operation of the first braking mode when the braking force of the first braking mode is insufficient, and may generate a higher braking pressure than the first braking mode.

Therefore, the first hydraulic pressure supply device 1310 may reduce the specifications of the motor due to the second hydraulic pressure supply device 1320, and also prevent the unnecessary load applied to the motor, thereby improving the durability and operational reliability of the device.

Hereinafter, the first braking mode among the normal operation modes of the electric brake system 1000 according to an exemplary embodiment of the present disclosure will be described.

Figure 2:
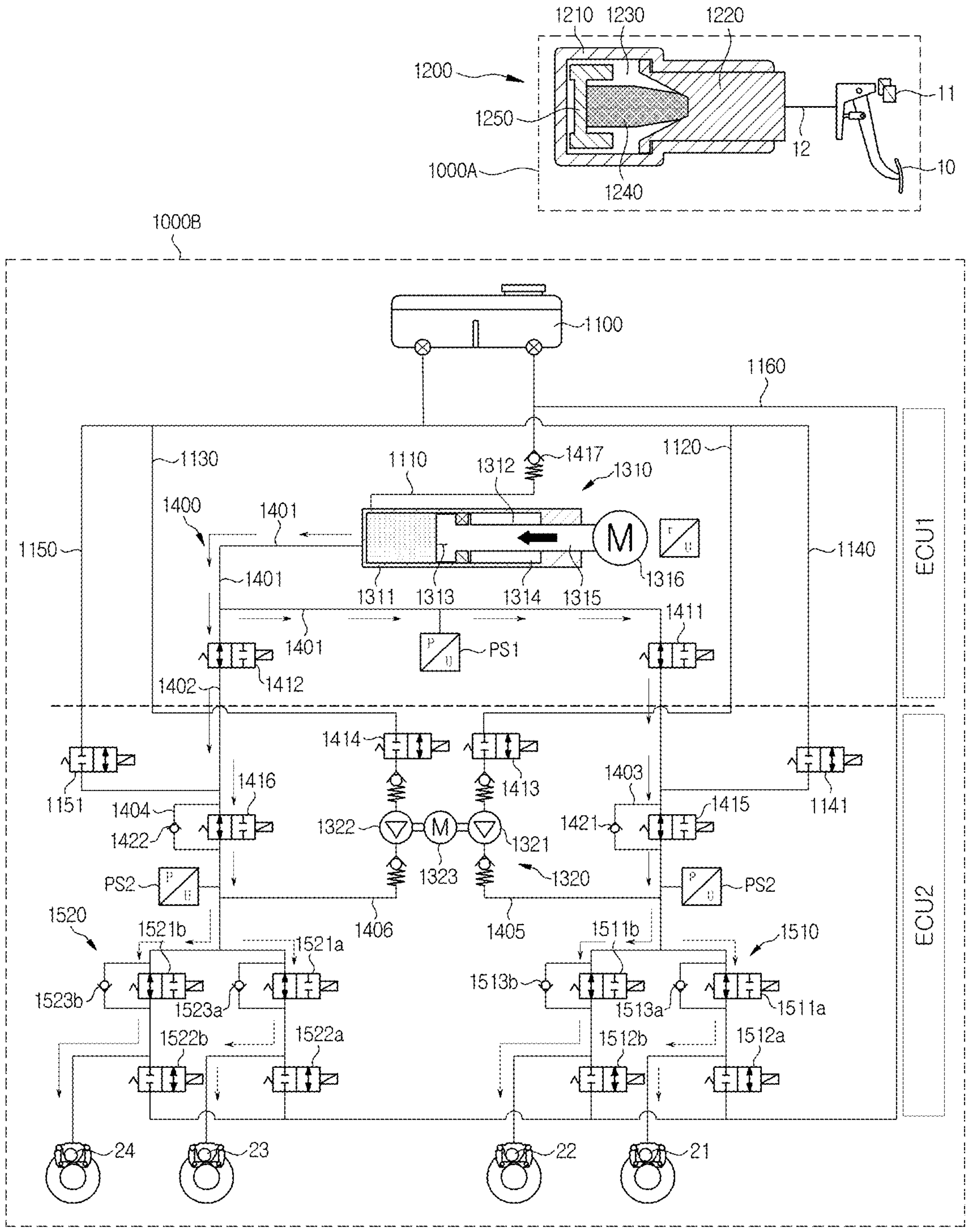
FIG. 2 is a hydraulic circuit diagram illustrating a state in which the electric brake system according to an exemplary embodiment of the present disclosure performs braking in a first braking mode.
Figure 3:
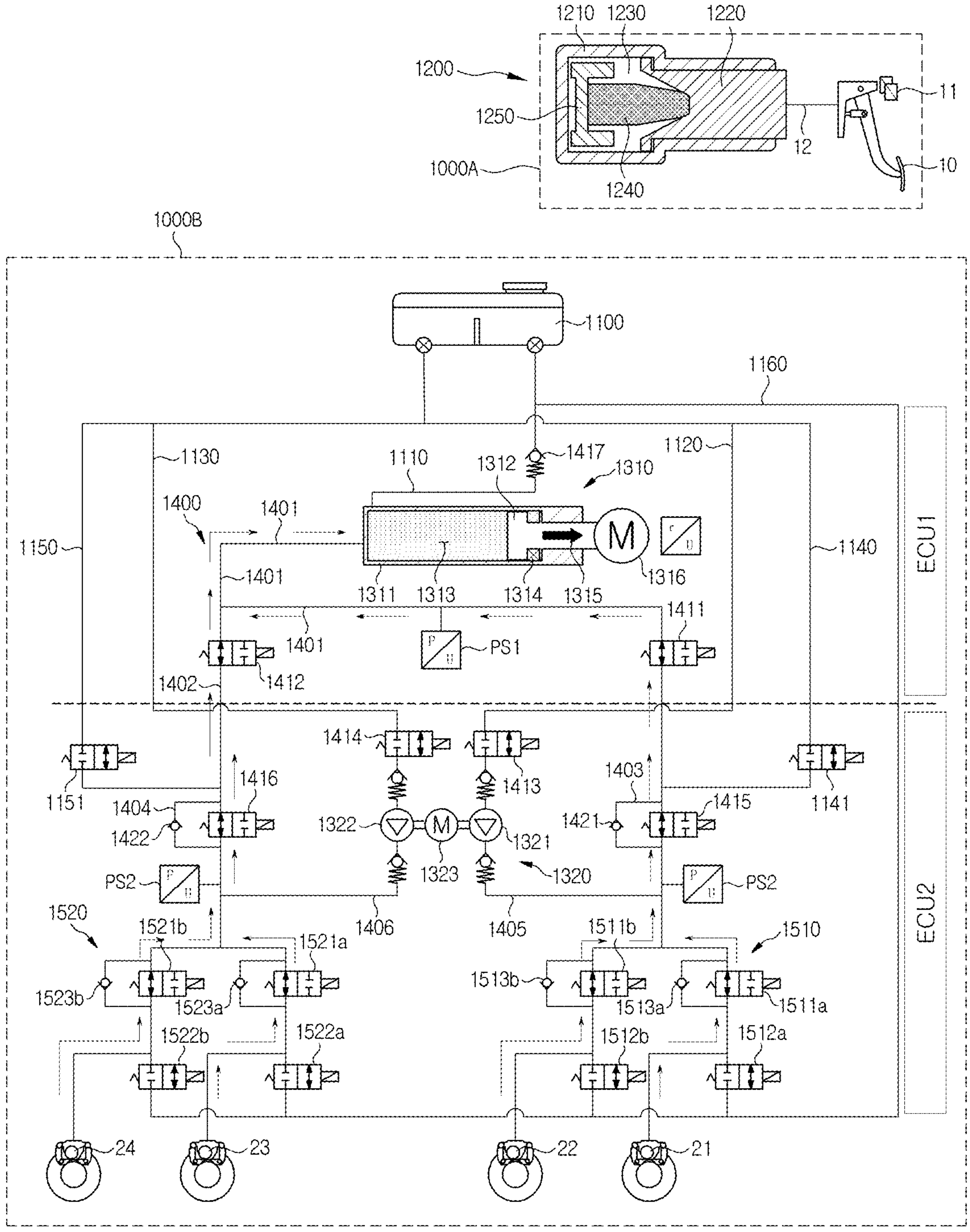
FIG. 3 is a hydraulic circuit diagram illustrating a state in which the electric brake system according to an exemplary embodiment of the present disclosure releases the braking in the first braking mode.

FIG. 2 is a hydraulic circuit diagram illustrating a state in which the electric brake system 1000 according to an exemplary embodiment of the present disclosure performs braking in a first braking mode, and FIG. 3 is a hydraulic circuit diagram illustrating a state in which the electric brake system 1000 according to an exemplary embodiment of the present disclosure releases the braking in the first braking mode.

Referring to FIG. 2, when a driver steps on the brake pedal 10 at the beginning of braking, the first motor 1316 operates to rotate in one direction, and the rotational force of the first motor 1316 is transmitted to the first hydraulic pressure supply device 1310 by the power conversion unit, and the hydraulic piston 1312 of the first hydraulic pressure supply device 1310 generates the hydraulic pressure in the pressure chamber 1313 while moving forward. The hydraulic pressure discharged from the pressure chamber 1313 is transmitted to each wheel cylinder 20 through the hydraulic control device 1400 and the first hydraulic circuit 1510 and the second hydraulic circuit 1520 to generate the braking force.

Specifically, the hydraulic pressure of the pressurized medium formed in the pressure chamber 1313 is transmitted to the first and second wheel cylinders 21 and 22 provided in the first hydraulic circuit 1510 through the first hydraulic passage 1401, and also transmitted to the third and fourth wheel cylinders 23 and 24 provided in the second hydraulic circuit 1520 through the second hydraulic passage 1402. In this case, the first electronic control unit ECU1 opens the first valve 1411 and the second valve 1412, so the hydraulic pressure of the pressurized medium may be smoothly transmitted to the first to fourth wheel cylinders 21, 22, 23, and 24. In addition, in the first braking mode, the fifth valve 1415 and the sixth valve 1416 are controlled to be opened, and the first check valve 1421 provided in the first bypass passage 1403 and the second check valve 1422 provided in the second bypass passage 1404 only allow the flow of the pressurized medium from the pressure chamber 1313 toward the hydraulic circuits 1510 and 1520, so the hydraulic pressure of the pressurized medium may be smoothly transmitted to the first to fourth wheel cylinders 21, 22, 23, and 24. In this case, a seventh check valve 1417 provided in the first reservoir passage 1110 only allows the flow of the pressurized medium from the reservoir 1100 toward the pressure chamber 1313, so the pressurized medium may be stably supplied to the pressure chamber 1313. In addition, the first to fourth inlet valves 1511*a*, 1511*b*, 1521*a*, and 1521*b* provided in the first and second hydraulic circuits 1510 and 1520 are maintained in an opened state, and the first to fourth outlet valves 1512*a*, 1512*b*, 1522*a*, and 1522*b* are switched to a closed state to prevent the hydraulic pressure of the pressurized medium from leaking toward the discharge passage. In addition, the first and second dump valves 1141 and 1151 provided in the first and second dump passages 1140 and 1150, respectively, are maintained in the closed state, and the check valves in the first and second auxiliary hydraulic passages 1405 and 1406 only allow the flow of the pressurized medium from the reservoir 1100 toward the hydraulic circuits 1510 and 1520, thereby preventing the hydraulic pressure of the pressurized medium from leaking toward the reservoir 1100.

Referring to FIG. 3, when the driver releases the brake pedal 10, the first motor 1316 operates to rotate in the opposite direction, and the rotational force of the first motor is transmitted to the first hydraulic pressure supply device 1310 by the power conversion unit, and the hydraulic piston 1312 of the first hydraulic pressure supply device 1310 generates a negative pressure in the pressure chamber 1313 while moving backward. The hydraulic pressure discharged from each wheel cylinder is transmitted to the first hydraulic pressure supply device 1310 through the first hydraulic circuit 1510 and the second hydraulic circuit 1520 and the hydraulic control device 1400 to release the braking force.

Specifically, the hydraulic pressure of the pressurized medium of the first and second wheel cylinders 21 and 22 provided in the first hydraulic circuit 1510 is transmitted to the pressure chamber 1313 through the first hydraulic passage 1401, and the hydraulic pressure of the pressurized medium of the third and fourth wheel cylinders 23 and 24 provided in the second hydraulic circuit 1520 is also transmitted to the pressure chamber 1313 through the second hydraulic passage 1402.

The electric brake system 1000 according to an exemplary embodiment of the present disclosure may be switched from the first braking mode to the ABS mode. Specifically, the ABS mode is a mode that may maintain an optimal grip force between the tire and the road by preventing the wheel from stopping completely when driving on a slippery road or when braking suddenly.

Figure 4:
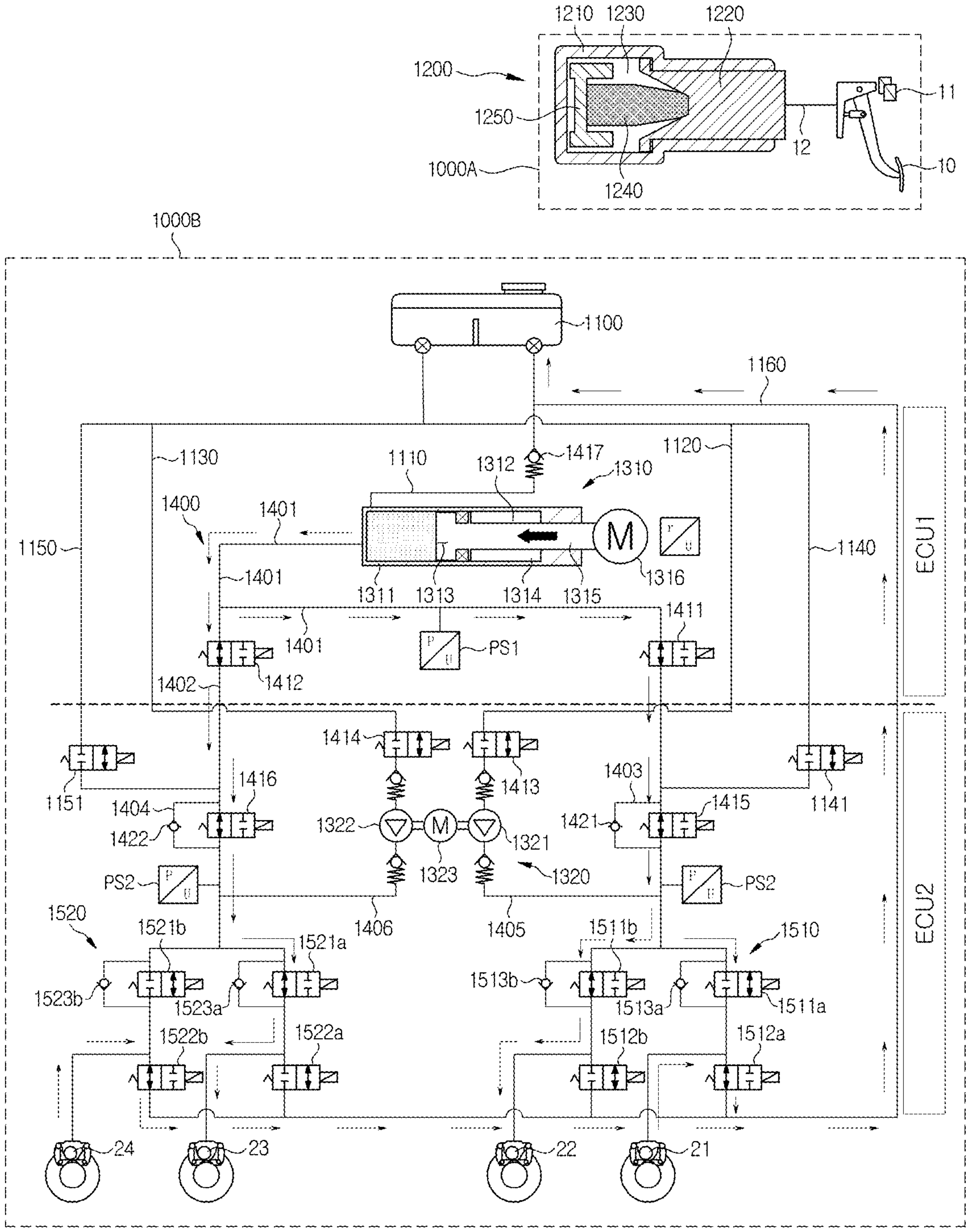
FIG. 4 is a hydraulic circuit diagram illustrating a state in which the electric brake system according to an exemplary embodiment of the present disclosure performs an ABS braking mode.
Figure 5:
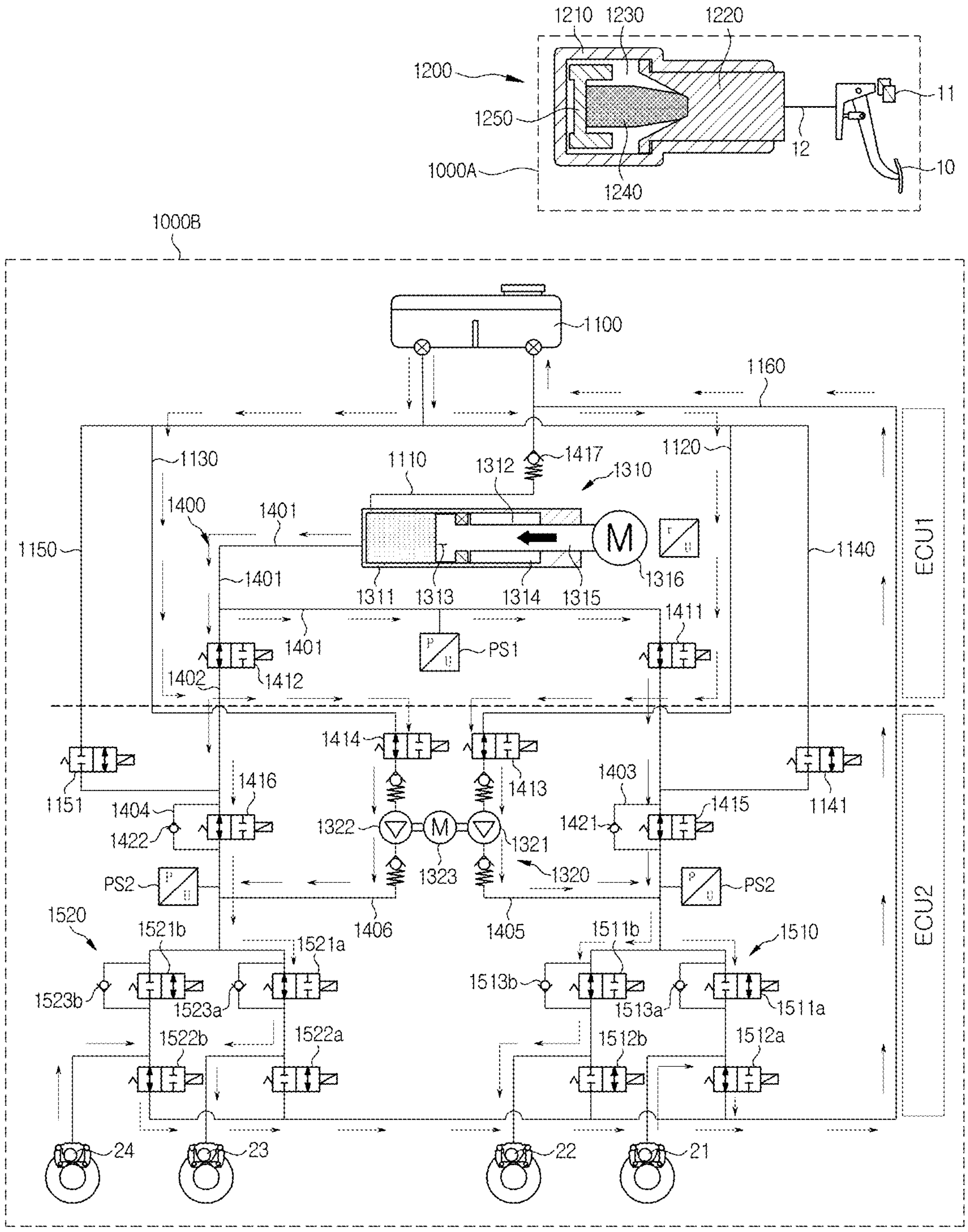
FIG. 5 is a hydraulic circuit diagram illustrating a state in which the electric brake system according to an exemplary embodiment of the present disclosure performs and supplements the ABS braking mode.

FIG. 4 is a hydraulic circuit diagram illustrating a state in which the electric brake system 1000 according to an exemplary embodiment of the present disclosure performs an ABS braking mode, and FIG. 5 is a hydraulic circuit diagram illustrating a state in which the electric brake system 1000 according to an exemplary embodiment of the present disclosure performs and supplements the ABS braking mode.

The operation of the valves that are not separately described in the ABS braking mode is the same as the operation of performing braking in the first braking mode of the electric brake system 1000 described above, and the description thereof will be omitted to prevent the duplication of contents.

Referring to FIG. 4, when the ABS braking mode is performed, the second electronic control unit ECU2 closes some of the first to fourth inlet valves 1511*a*, 1511*b*, 1521*a*, and 1521*b*, and opens some of the first to fourth outlet valves 1512*a*, 1512*b*, 1522*a*, and 1522*b*, so the hydraulic pressure of the pressurized medium of some of the first to fourth wheel cylinders 21, 22, 23, and 24 may be momentarily discharged to the reservoir 1100 through the discharge passage 1160 and depressurized and the valves may be re-pressurized by operating in the opposite direction.

Specifically, when the ABS braking mode is performed, the first and fourth inlet valves 1511*a* and 1521*b* are closed and the first and fourth outlet valves 1512*a* and 1522*b* are opened so that the pressurized medium of the first and fourth wheel cylinders 21 and 24 is discharged to the reservoir 1100 through the discharge passage 1160, thereby releasing the braking force of the first and fourth wheel cylinders 21 and 24, and the first and fourth inlet valves 1511*a* and 1521*b* are opened again and the first and fourth outlet valves 1512*a* and 1522*b* are closed, thereby generating the braking force while the pressurized medium is transmitted to the first and fourth wheel cylinders 21 and 24. However, this is not limited to the first and fourth wheel cylinders 21 and 24, and may be selectively applied to the first to fourth wheel cylinders 21, 22, 23, and 24.

Referring to FIG. 5, in the ABS braking mode, the second electronic control unit ECU2 operates the second hydraulic pressure supply device 1320 to subsidiarily transmit the pressurized medium to the wheel cylinders to perform the pressurization and re-pressurization.

Specifically, after the ABS braking mode is performed, when the second motor 1323 operates, the first and second hydraulic pumps 1321 and 1322 operate, and the third and fourth valves 1413 and 1414 are switched to an opened state, so that the pressurized medium accommodated in the reservoir 1100 is pressurized through the first and second hydraulic pumps 1321 and 1322 and transmitted to the first and second hydraulic circuits 1510 and 1520.

Hereinafter, the second braking mode among the normal operation modes of the electric brake system 1000 according to an exemplary embodiment of the present disclosure will be described.

Figure 6:
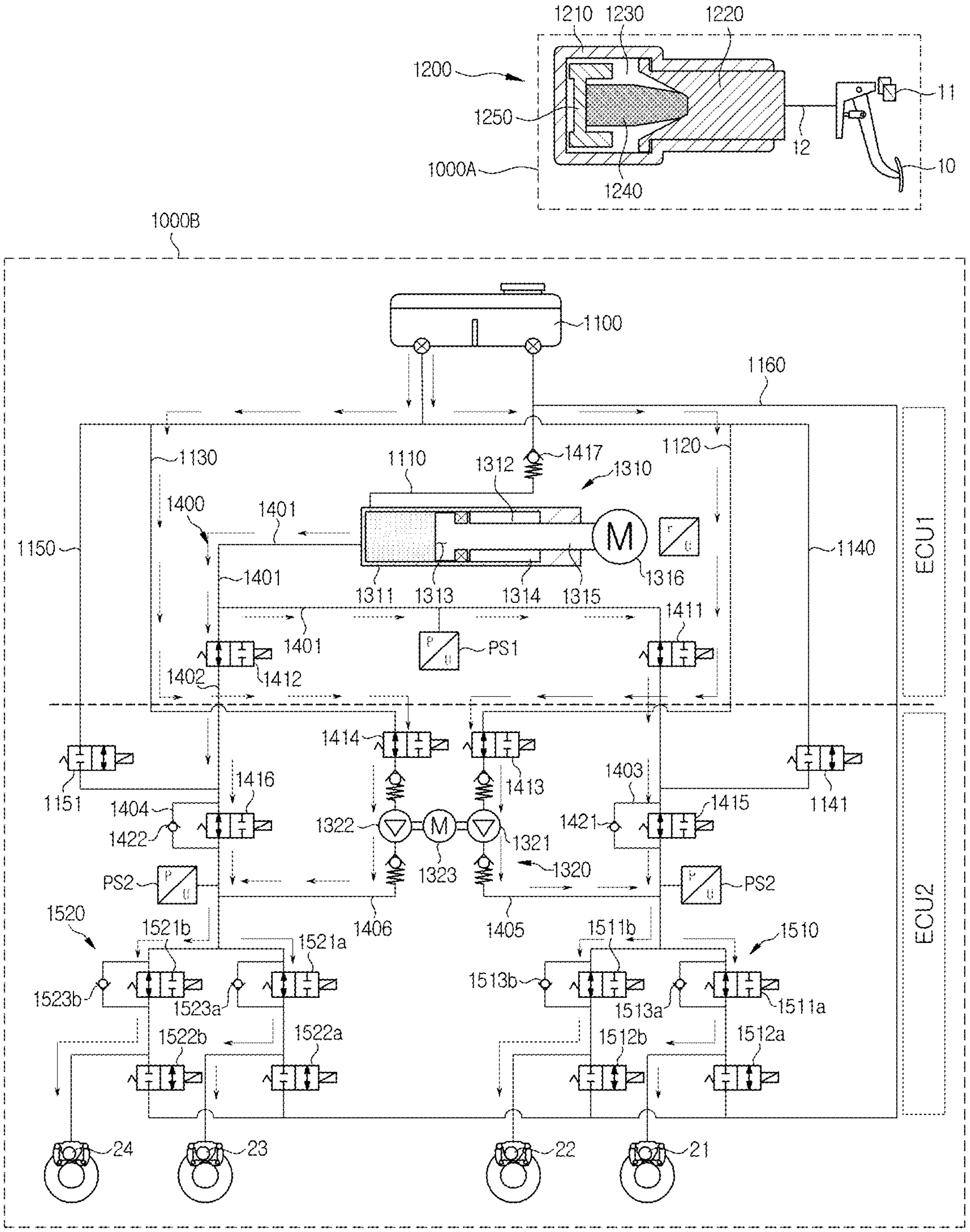
FIG. 6 is a hydraulic circuit diagram illustrating a state in which the electric brake system according to an exemplary embodiment of the present disclosure performs braking in a second braking mode.
Figure 7:
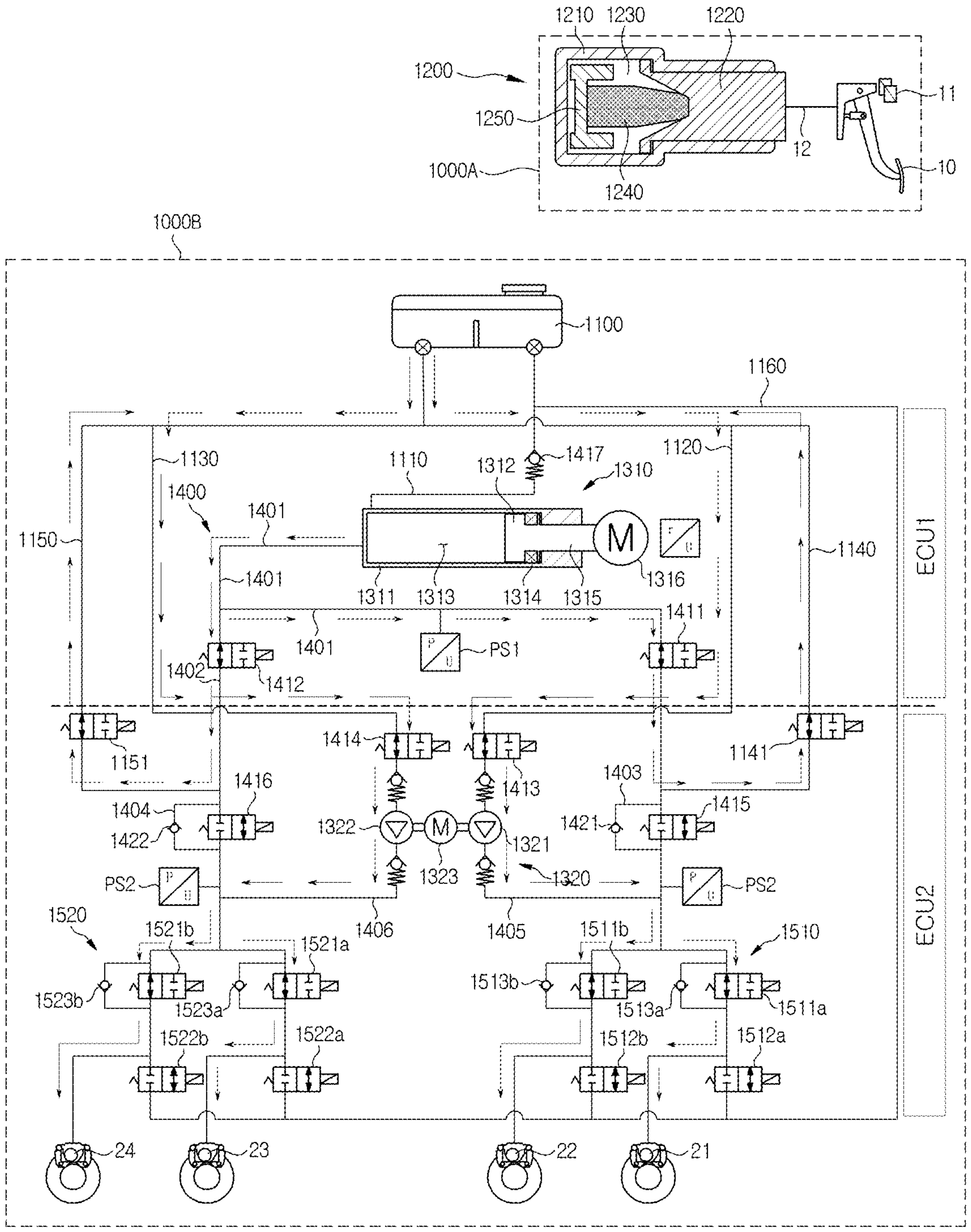
FIG. 7 is a hydraulic circuit diagram illustrating a state in which the electric brake system according to an exemplary embodiment of the present disclosure releases the braking in the second braking mode.

FIG. 6 is a hydraulic circuit diagram illustrating a state in which the electric brake system 1000 according to an exemplary embodiment of the present disclosure performs braking in a second braking mode, and FIG. 7 is a hydraulic circuit diagram illustrating a state in which the electric brake system 1000 according to an exemplary embodiment of the present disclosure releases the braking in the second braking mode.

The operation of the valves that are not separately described in the second braking mode is the same as the operation of performing braking in the first braking mode of the electric brake system 1000 described above, and the description thereof will be omitted to prevent the duplication of contents.

Referring to FIG. 6, when the second braking mode is performed, the second electronic control unit ECU2 operates the second hydraulic pressure supply device 1320, switches the third and fourth valves 1414 to the opened state, and switches the fifth and sixth valves 1416 to the closed state so that the pressurized medium in the reservoir 1100 is pressurized and then transmitted to the wheel cylinder to generate the braking force.

Specifically, the third and fourth valves 1414 are opened so that the pressurized medium in the reservoir is transmitted to the first and second hydraulic pumps 1321 and 1322, and the hydraulic pressure of the pressurized medium formed in the first and second hydraulic pumps 1321 and 1322 is transmitted to the first and second wheel cylinders 21 and 22 provided in the first hydraulic circuit 1510 through the first auxiliary hydraulic passage 1405, and transmitted to the third and fourth wheel cylinders 23 and 24 provided in the second hydraulic circuit 1520 through the second auxiliary hydraulic passage 1406. In this case, the second electronic control unit ECU2 may close the fifth and sixth valves 1415 and 1416 to prevent the hydraulic pressure of the pressurized medium from leaking into the pressure chamber 1313 of the first hydraulic pressure supply device 1310. In addition, in the second braking mode, the first check valve 1421 provided in the first bypass passage 1403 and the second check valve 1422 provided in the second bypass passage 1404 only allow the flow of the pressurized medium from the pressure chamber 1313 toward the hydraulic circuits 1510 and 1520, thereby preventing the hydraulic pressure of the pressurized medium transmitted through the first and second auxiliary hydraulic passages 1405 and 1406 from leaking into the pressure chamber 1313 of the first hydraulic pressure supply device 1310. In addition, the check valves provided on the input side and the discharge side of the first and second hydraulic pumps 1321 and 1322 only allow the flow of the pressurized medium from the reservoir 1100 toward the hydraulic circuits 1510 and 1520, so that the pressurized medium may be stably supplied to the hydraulic circuits 1510 and 1520.

Referring to FIG. 7, when the braking in the second braking mode is released, the second electronic control unit ECU2 switches the first dump valve 1141 and the second dump valve 1151 to the opened state, thereby allowing the pressurized medium inside the pressure chamber 1313 to communicate with the reservoir 1100 and reducing the pressure inside the pressure chamber 1313.

Specifically, in the state where the braking in the second braking mode is performed, the second electronic control unit ECU2 switches the first dump valve 1141 and the second dump valve 1151 to the opened state, so that the pressurized medium inside the pressure chamber 1313 may be sequentially transmitted to the reservoir by sequentially passing through the first hydraulic passage 1401 and the first dump passage 1140, and also transmitted to the reservoir 1100 by sequentially passing through the second hydraulic passage 1402 and the second dump passage 1150.

Hereinafter, the operating state of the abnormal operating mode to which the electric brake system 1000 according to an exemplary embodiment of the present disclosure switches when the braking by the first hydraulic pressure supply device 1310 is impossible will be described. In this case, the case where the braking by the first hydraulic pressure supply device 1310 is impossible includes the case where the first hydraulic pressure supply device 1310 is completely inoperable and the case where the first hydraulic pressure supply device 1310 operates but does not generate the original braking pressure.

Figure 8:
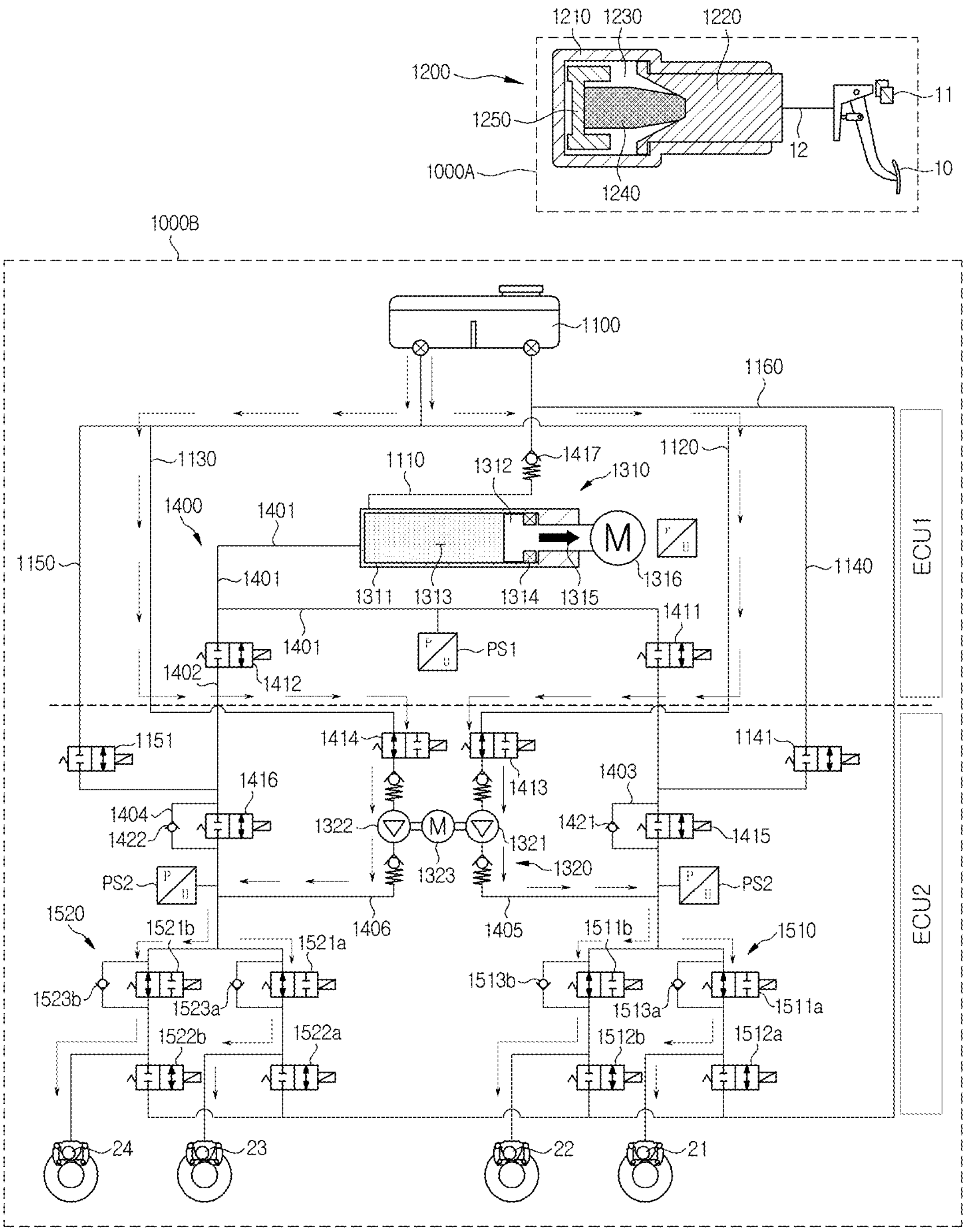
FIG. 8 is a hydraulic circuit diagram illustrating a state in which the electric brake system according to an exemplary embodiment of the present disclosure performs an abnormal operation mode.
Figure 9:
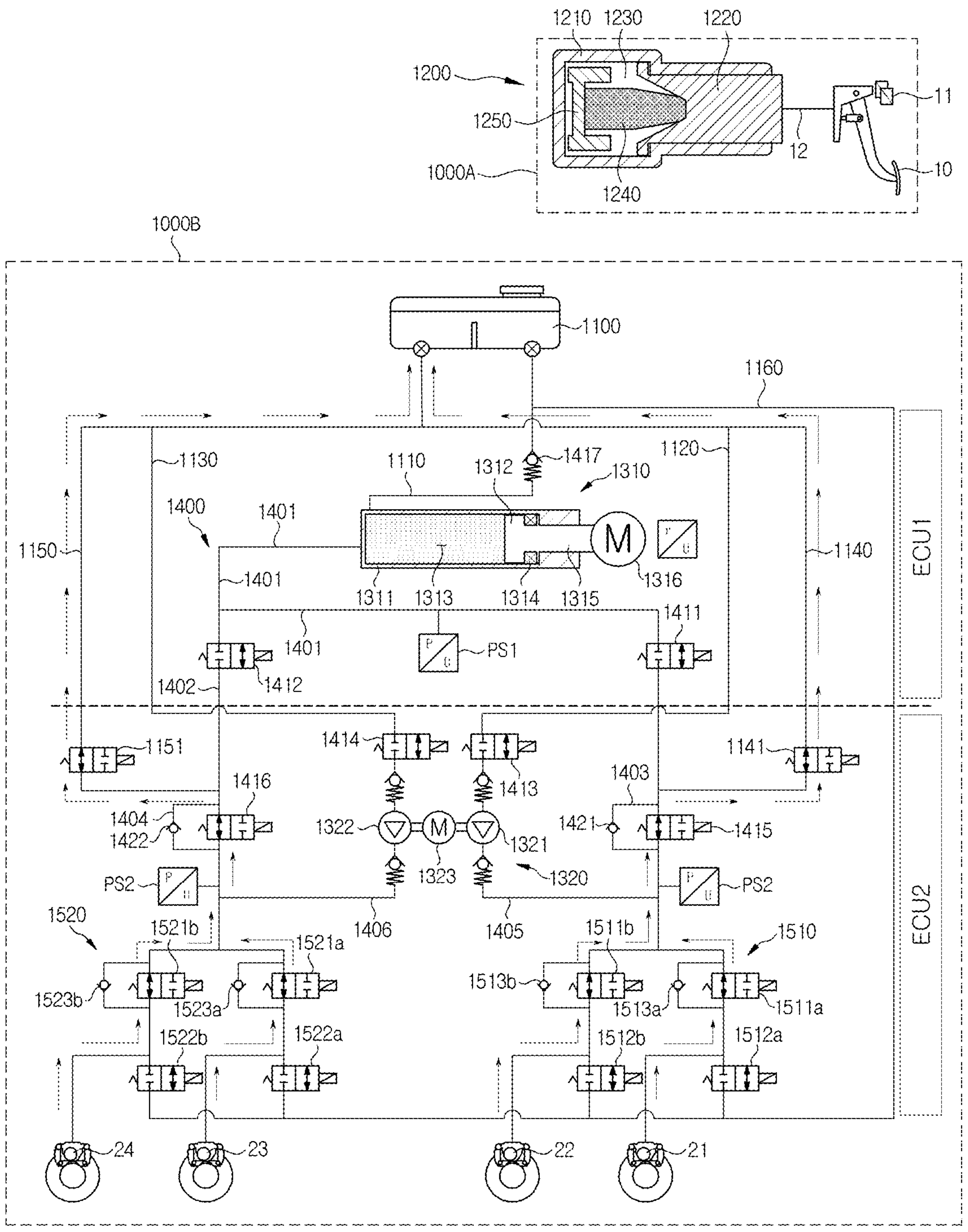
FIG. 9 is a hydraulic circuit diagram illustrating a state in which the electric brake system according to an exemplary embodiment of the present disclosure performs the abnormal operation mode.

FIG. 8 is a hydraulic circuit diagram illustrating a state in which the electric brake system 1000 according to an exemplary embodiment of the present disclosure performs an abnormal operation mode, and FIG. 9 is a hydraulic circuit diagram illustrating a state in which the electric brake system 1000 according to an exemplary embodiment of the present disclosure performs the abnormal operation mode.

Referring to FIG. 8, when the driver steps on the brake pedal 10 at the beginning of braking, the second motor 1323 of the second hydraulic pressure supply device 1320 operates, and the first and second hydraulic pumps 1321 and 1322 operate by the second motor 1323 to generate the hydraulic pressure. Accordingly, the hydraulic pressure discharged from the hydraulic pumps 1321 and 1322 is transmitted to each wheel cylinder 20 through the auxiliary hydraulic passages 1405 and 1406 to generate the braking force.

Specifically, the pressurized medium accommodated in the reservoir is transmitted to the first hydraulic pump 1321 and the second hydraulic pump 1322 through the second reservoir passage 1120 and the third reservoir passage 1130, respectively, and the first hydraulic pump 1321 and the second hydraulic pump 1322 pressurize the pressurized medium and transmit the pressurized medium to the first and second wheel cylinders 21 and 22 provided in the first hydraulic circuit 1510 and the third and fourth wheel cylinders 23 and 24 provided in the second hydraulic circuit 1520, respectively. In this case, the second electronic control unit ECU2 opens the third valve 1413 and the fourth valve 1414, so the hydraulic pressure of the pressurized medium may be smoothly transmitted to the first to fourth wheel cylinders 21, 22, 23, and 24. On the other hand, the first electronic control unit ECU1 does not operate the first motor of the first hydraulic pressure supply device 1310 and keeps the first valve 1411, the second valve 1412, the fifth valve 1415, and the sixth valve 1416 closed, so the pressurized medium of the pressure chamber 1313 is not transmitted to the first and second hydraulic circuits 1510 and 1520, and the pressurized medium transmitted to the first hydraulic passage 1401 through the first auxiliary hydraulic passage 1405 and the pressurized medium transmitted to the second hydraulic passage 1402 through the second auxiliary hydraulic passage 1406 may be prevented from leaking toward the pressure chamber 1313.

Referring to FIG. 9, when the driver releases the brake pedal 10, the operation of the second motor 1323 stops, and the operation of the first and second hydraulic pumps 1321 and 1322 stops due to the stoppage of the operation of the second motor 1323, thereby stopping the generation of the hydraulic pressure. Accordingly, the pressurized medium of the first to fourth wheel cylinders 21, 22, 23, and 24 is transmitted to the reservoir through the dump passages 1140 and 1150, thereby releasing the braking force.

Specifically, the pressurized medium of the first to fourth wheel cylinders 21, 22, 23, and 24 is transmitted to the reservoir 1100 by sequentially passing through the first hydraulic passage 1401 and the first dump passage 1140, or transmitted to the reservoir 1100 by sequentially passing through the second hydraulic passage 1402 and the second dump passage 1150. In this case, the second electronic control unit ECU2 closes the third valve 1413 and the fourth valve 1414 to prevent the pressurized medium of the reservoir 1100 from being transmitted to the first hydraulic pump 1321 and the second hydraulic pump 1322, and opens the fifth valve 1415, the sixth valve 1416, the first dump valve 1141, and the second dump valve 1151 to ensure that the pressurized medium of the first hydraulic circuit 1510 and the second hydraulic circuit 1520 are transmitted to the reservoir 1100 through the first dump passage 1140 and the second dump passage 1150. In addition, the check valves provided on the discharge sides of the first hydraulic pump 1321 and the second hydraulic pump 1322 only allow the flow of the pressurized medium from the hydraulic pump toward the hydraulic circuit 1510 and 1520, thereby preventing the pressurized medium from being transmitted from the first hydraulic circuit 1510 and the second hydraulic circuit 1520 to the first hydraulic pump 1321 and the second hydraulic pump 1322.

As described above, the present disclosure has been described with reference to exemplary embodiments and the accompanying drawings, but the present disclosure is not limited thereto, and may be variously modified and altered by those skilled in the art to which the present disclosure pertains without departing from the spirit and scope of the present disclosure claimed in the following claims.

What is claimed is:

1. An electric brake system, comprising:

a hydraulic pressure providing unit that generates a hydraulic pressure of a pressurized medium for braking a vehicle based on an electric signal output in response to a displacement of a brake pedal, wherein the hydraulic pressure providing unit includes a reservoir in which the pressurized medium is stored, and which is partitioned into a plurality of reservoir chambers by a partition wall, a first hydraulic pressure supply device that generates the hydraulic pressure by operating a hydraulic piston by the electric signal output in response to the displacement of the brake pedal, a hydraulic control device that controls a flow of the pressurized medium provided from the first hydraulic pressure supply device or recovered to the first hydraulic pressure supply device, a hydraulic circuit that regulates the hydraulic pressure of the pressurized medium applied to a plurality of wheel cylinders, and a second hydraulic pressure supply device that generates the hydraulic pressure by operating a hydraulic pump by the electric signal output in response to the displacement of the brake pedal, and a discharge passage connecting the plurality of wheel cylinders and the reservoir so that the pressurized medium of the plurality of wheel cylinders is discharged into the reservoir, the second hydraulic pressure supply device is provided between the hydraulic control device and the hydraulic circuit, wherein the hydraulic circuit includes a first hydraulic circuit that controls the flow of the pressurized medium supplied to a first wheel cylinder and a second wheel cylinder, and a second hydraulic circuit that controls the flow of the pressurized medium supplied to a third wheel cylinder and a fourth wheel cylinder, and the second hydraulic pressure supply device includes at least one hydraulic pump that provides the hydraulic pressure of the pressurized medium to the first hydraulic circuit and the second hydraulic circuit, and a reservoir passage that connects the reservoir and a suction side of the hydraulic pump, wherein the reservoir passage is connected to one of the reservoir chambers, and the discharge passage is connected to another one of the reservoir chambers.

2. The electric brake system of claim 1, wherein the hydraulic pump includes a first hydraulic pump that provides the hydraulic pressure of the pressurized medium to the first hydraulic circuit, and a second hydraulic pump that provides the hydraulic pressure of the pressurized medium to the second hydraulic circuit.

3. The electric brake system of claim 2, wherein the first hydraulic pressure supply device includes a pressure chamber in which the hydraulic piston is provided, the hydraulic control device includes a first hydraulic passage connecting the pressure chamber and the first hydraulic circuit, and a second hydraulic passage connecting the pressure chamber and the second hydraulic circuit, the first hydraulic passage includes a first valve that controls the flow of the pressurized medium, and the second hydraulic passage includes a second valve that controls the flow of the pressurized medium.

4. The electric brake system of claim 3, wherein the hydraulic pressure providing unit further includes a first reservoir passage that connects the reservoir and the pressure chamber;

wherein the reservoir passage includes a second reservoir passage that connected to the first hydraulic pump, and a third reservoir passage that connected to the second hydraulic pump, wherein the second reservoir passage and the third reservoir passage are each connected to a same reservoir chamber.

5. The electric brake system of claim 4, wherein the second reservoir passage includes a third valve that controls the flow of the pressurized medium, and the third reservoir passage includes a fourth valve that controls the flow of the pressurized medium.

6. The electric brake system of claim 5, wherein the hydraulic pressure providing unit further includes a first dump passage that connects the reservoir and the first hydraulic passage, and a second dump passage that connects the reservoir and the second hydraulic passage, one end of the first dump passage is connected to the reservoir, and the other end is connected to a rear end side of a point where the first valve is provided on the first hydraulic passage, and one end of the second dump passage is connected to the reservoir, and the other end is connected to a rear end side of a point where the second valve is provided on the second hydraulic passage.

7. The electric brake system of claim 6, wherein the first dump passage includes a first dump valve that controls the flow of the pressurized medium, and the second dump passage includes a second dump valve that controls the flow of the pressurized medium.

8. The electric brake system of claim 7, wherein the first hydraulic passage includes a fifth valve that is provided at a rear end side of a point to which the first dump passage is connected and controls the flow of the pressurized medium, and the second hydraulic passage includes a sixth valve that is provided at a rear end side of a point to which the second dump passage is connected and controls the flow of the pressurized medium.

9. The electric brake system of claim 1, further comprising:

an electronic control unit that controls the hydraulic pressure supply device, wherein the electronic control unit includes a first electronic control unit that controls the first hydraulic pressure supply device and a second electronic control unit that controls the second hydraulic pressure supply device.

10. The electric brake system of claim 8, further comprising:

an electronic control unit that controls the hydraulic pressure supply device; and a pressure sensor that detects the hydraulic pressure of the pressurized medium, wherein the pressure sensor includes a first pressure sensor that is provided on a front end side of the point where the first valve is provided on the first hydraulic passage or on a front end side of the point where the second valve is provided on the second hydraulic passage and detects the hydraulic pressure of the pressurized medium, and a second pressure sensor that is provided on a rear end side of a point where the fifth valve is provided on the first hydraulic passage or on a rear end side of a point where the sixth valve is provided on the second hydraulic passage and detects the hydraulic pressure of the pressurized medium, and the electronic control unit includes a first electronic control unit that receives information of the first pressure sensor and a second electronic control unit that receives information of the second pressure sensor.

11. The electric brake system of claim 10, wherein the first electronic control unit controls the first and second valves, and the second electronic control unit controls the first and second hydraulic circuits, the third to sixth valves, and the first and second dump valves.

12. The electric brake system of claim 3, wherein the hydraulic pressure providing unit further includes a first auxiliary hydraulic passage that connects an output terminal of the first hydraulic pump and the first hydraulic circuit, and a second auxiliary hydraulic passage that connects an output terminal of the second hydraulic pump and the second hydraulic circuit.

13. The electric brake system of claim 3, wherein the hydraulic control device further includes a first bypass passage that is connected in parallel to the first valve on the first hydraulic passage, and a second bypass passage that is connected in parallel to the second valve on the second hydraulic passage, the first bypass passage includes a first check valve that allows only the flow of the pressurized medium discharged from the pressure chamber to the first hydraulic circuit, and the second bypass passage further includes a second check valve that allows only the flow of the pressurized medium discharged from the pressure chamber to the second hydraulic circuit.

14. The electric brake system of claim 4, wherein the first hydraulic circuit includes a first inlet valve and a second inlet valve that are provided on inlet sides of the first wheel cylinder and the second wheel cylinder, respectively, to control the flow of the pressurized medium, and a first outlet valve and a second outlet valve that are provided on outlet sides of the first wheel cylinder and the second wheel cylinder, respectively, to control the flow of the pressurized medium discharged to the reservoir, the second hydraulic circuit includes a third inlet valve and a fourth inlet valve that are provided on inlet sides of the third wheel cylinder and the fourth wheel cylinder, respectively, to control the flow of pressurized medium, and a third outlet valve and a fourth outlet valve that are provided on outlet sides of the third wheel cylinder and the fourth wheel cylinder, respectively, to control the flow of the pressurized medium discharged to the reservoir, and the discharge passage that connects the reservoir and the first to fourth outlet valves.

15. The electric brake system of claim 8, wherein the first to fourth valves are provided as a normal closed type that operates to open the valves when receiving the electric signal, and the fifth and sixth valves are provided as a normal opened type that operates to close the valves when receiving the electric signal.

16. The electric brake system of claim 1, further comprising:

a pedal unit that is connected to the brake pedal and operates by a driver's effort and physically separated from the hydraulic pressure providing unit, wherein the pedal unit further includes a simulation piston that is displaced by an operation of the brake pedal, a simulation chamber whose volume is variable by the displacement of the simulation piston, and a pedal simulator that includes an elastic member that is provided in the simulation chamber, compressed by the displacement of the simulation piston, and provides pedal feeling through an elastic restoring force generated from the compression to generate a reaction force to the effort of the brake pedal and provide the pedal feeling to the driver.

17. A method of operating an electric brake system of claim 1, wherein a normal operation mode includes a first braking mode in which the hydraulic piston of the first hydraulic pressure supply device moves forward and the pressurized medium accommodated in a pressure chamber in which the hydraulic piston is provided is transmitted to the plurality of wheel cylinders, and a second braking mode in which the hydraulic pump of the second hydraulic pressure supply device operates and the pressurized medium accommodated in a reservoir is transmitted to the plurality of wheel cylinders.

18. The method of claim 17, wherein the second braking mode additionally operates after the operation of the first braking mode when a higher braking pressure than the first braking mode is required.

19. The method of claim 17, includes an abnormal operation mode that is switched when the braking by the first hydraulic pressure supply device is impossible, wherein the abnormal operation mode operates the hydraulic pump of the second hydraulic pressure supply device so that the pressurized medium included in the reservoir is transmitted to the plurality of wheel cylinders.

20. The method of claim 19, wherein the abnormal operation mode operates so that the first and second valves are closed, and the first and second hydraulic pumps operate so that the pressurized medium accommodated in the reservoir is transmitted to the plurality of wheel cylinders.

* * * * *